United States Patent [19]
Abe et al.

[11] Patent Number: 4,920,571
[45] Date of Patent: Apr. 24, 1990

[54] IMAGE PROCESSING SYSTEM WITH CAPABILITY OF ENLARGING AND REDUCING OPERATIONS

[75] Inventors: Yoshinori Abe; Masahiko Matsunawa; Hiroyuki Yamamoto, all of Hachioji, Japan

[73] Assignee: Konishiroku Photo Industry Co., Ltd., Tokyo, Japan

[21] Appl. No.: 349,952

[22] Filed: May 8, 1989

Related U.S. Application Data

[63] Continuation of Ser. No. 277,460, Nov. 23, 1988, abandoned, which is a continuation of Ser. No. 5,553, Jan. 20, 1987, abandoned.

[30] Foreign Application Priority Data

| Jan. 22, 1986 | [JP] | Japan | 61-9946 |
| Mar. 22, 1986 | [JP] | Japan | 61-64503 |
| Mar. 22, 1986 | [JP] | Japan | 61-64505 |
| Mar. 22, 1986 | [JP] | Japan | 61-64506 |

[51] Int. Cl.$^5$ .............................................. G06K 9/42
[52] U.S. Cl. ................................ 382/47; 358/428; 358/451
[58] Field of Search .................... 382/41, 47; 358/428, 358/431, 451

[56] References Cited

U.S. PATENT DOCUMENTS

| 3,976,982 | 8/1976 | Eiselen | 382/47 |
| 4,127,870 | 11/1978 | Colditz | 358/77 |
| 4,275,450 | 6/1981 | Potter | 382/47 |
| 4,305,093 | 12/1981 | Nasu | 358/77 |
| 4,439,790 | 3/1984 | Yoshida | 358/293 |
| 4,520,399 | 5/1985 | Iida | 358/287 |
| 4,528,693 | 7/1985 | Pearson | 382/47 |
| 4,536,802 | 8/1985 | Kinata | 358/287 |
| 4,569,081 | 2/1986 | Mintzer | 382/47 |
| 4,587,621 | 5/1986 | DuVall | 382/42 |
| 4,598,323 | 7/1986 | Honjo et al. | 358/293 |
| 4,633,503 | 12/1986 | Hinman | 382/45 |
| 4,682,243 | 6/1987 | Hatayama | 382/47 |
| 4,686,580 | 8/1987 | Kato | 382/47 |
| 4,712,141 | 12/1987 | Tomoshisa et al. | 358/287 |
| 4,725,892 | 2/1988 | Suzuki et al. | 358/451 |
| 4,734,785 | 3/1988 | Takei et al. | 358/287 |
| 4,734,786 | 3/1988 | Minakawa et al. | 358/287 |

Primary Examiner—Leo H. Boudreau
Assistant Examiner—Jose L. Couso
Attorney, Agent, or Firm—Frishauf, Holtz, Goodman & Woodward

[57] ABSTRACT

An apparatus for providing high-quality enlarged or reduced image by employing a simple circuit configuration which incorporates an interpolation method. For this purpose, the apparatus is so constituted that the interpolation data is provided to compensate for a gap of data between pixels in the entire image data, and that the interpolation data are produced from look-up tables based on interpolation data selection signals which are outputted in accordance with a designated scale ratio.

30 Claims, 29 Drawing Sheets

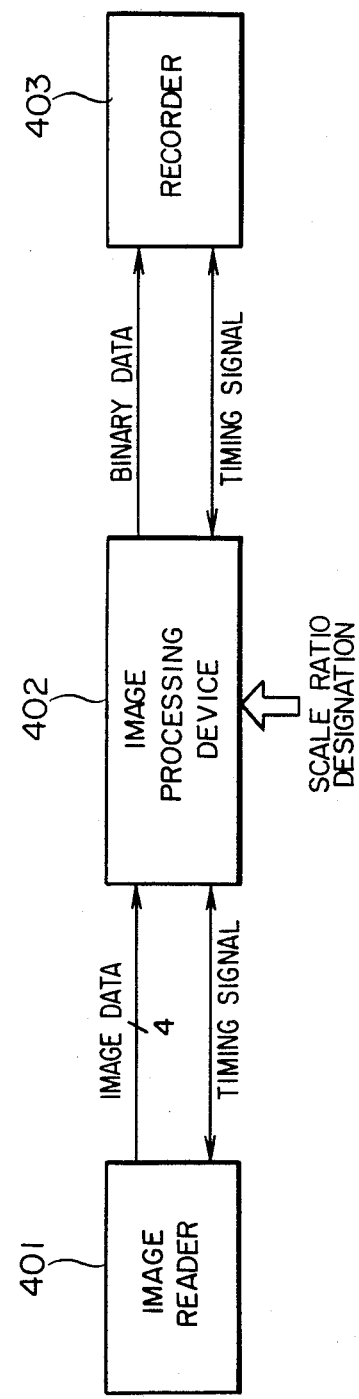
FIG. 1-a

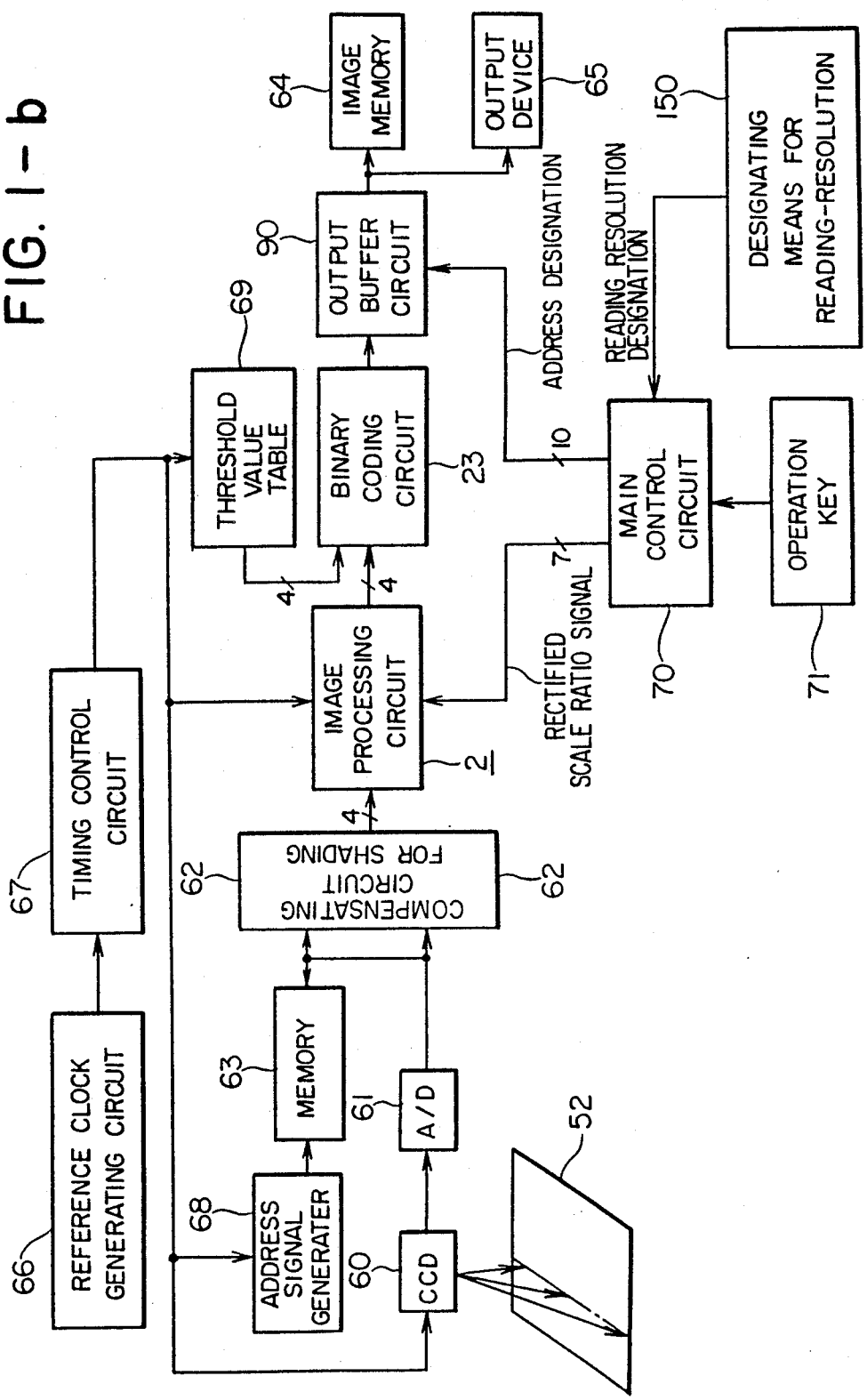
FIG. 1-b

| $D_0$ | $D_1$ | \multicolumn{16}{c}{DATA SELECTION SIGNAL SD} |
| | | +0 | +1 | +2 | +3 | +4 | +5 | +6 | +7 | +8 | +9 | +A | +B | +C | +D | +E | +F |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 0 | 0 | 0 | 0 | 0 | 0 | 1 | 1 | 1 | 1 | 1 | 1 | 1 | 1 |
| 0 | 2 | 0 | 0 | 0 | 0 | 1 | 1 | 1 | 1 | 1 | 1 | 1 | 1 | 2 | 2 | 2 | 2 |
| 0 | 3 | 0 | 0 | 0 | 1 | 1 | 1 | 1 | 1 | 2 | 2 | 2 | 2 | 2 | 2 | 3 | 3 |
| 0 | 4 | 0 | 0 | 0 | 1 | 1 | 1 | 2 | 2 | 2 | 2 | 3 | 3 | 3 | 3 | 4 | 4 |
| 0 | 5 | 0 | 0 | 1 | 1 | 1 | 2 | 2 | 2 | 3 | 3 | 3 | 3 | 4 | 4 | 4 | 5 |
| 0 | 6 | 0 | 0 | 1 | 1 | 2 | 2 | 2 | 3 | 3 | 3 | 4 | 4 | 5 | 5 | 5 | 6 |
| 0 | 7 | 0 | 0 | 1 | 1 | 2 | 2 | 3 | 3 | 3 | 4 | 4 | 5 | 5 | 6 | 6 | 7 |
| 0 | 8 | 0 | 1 | 1 | 2 | 2 | 3 | 3 | 4 | 4 | 5 | 5 | 6 | 6 | 7 | 7 | 8 |
| 0 | 9 | 0 | 1 | 1 | 2 | 2 | 3 | 3 | 4 | 5 | 5 | 6 | 6 | 7 | 7 | 8 | 9 |
| 0 | A | 0 | 1 | 1 | 2 | 2 | 3 | 4 | 4 | 5 | 6 | 6 | 7 | 8 | 8 | 9 | A |
| 0 | B | 0 | 1 | 1 | 2 | 3 | 3 | 4 | 5 | 5 | 6 | 7 | 8 | 8 | 9 | A | B |
| 0 | C | 0 | 1 | 2 | 2 | 3 | 4 | 4 | 5 | 6 | 7 | 8 | 8 | 9 | A | B | B |
| 0 | D | 0 | 1 | 2 | 2 | 3 | 4 | 5 | 6 | 7 | 7 | 8 | 9 | A | B | B | C |
| 0 | E | 0 | 1 | 2 | 3 | 4 | 4 | 5 | 6 | 7 | 8 | 9 | A | B | B | C | D |
| 0 | F | 0 | 1 | 2 | 3 | 4 | 5 | 6 | 7 | 8 | 9 | A | B | C | D | E | F |

INTERPOLATION DATA S

:
:

| $D_0$ | $D_1$ | +0 | +1 | +2 | +3 | +4 | +5 | +6 | +7 | +8 | +9 | +A | +B | +C | +D | +E | +F |
|---|---|---|---|---|---|---|---|---|---|---|---|---|---|---|---|---|---|
| F | 0 | F | E | D | C | B | A | 9 | 8 | 8 | 7 | 6 | 5 | 4 | 3 | 2 | 1 |
| F | 1 | F | E | D | C | C | B | A | 9 | 9 | 8 | 7 | 6 | 5 | 4 | 3 | 2 |
| F | 2 | F | E | D | D | C | B | A | 9 | 9 | 8 | 7 | 6 | 5 | 4 | 4 | 3 |
| F | 3 | F | E | E | D | C | B | B | A | 9 | 8 | 8 | 7 | 6 | 5 | 5 | 4 |
| F | 4 | F | E | E | D | C | C | B | A | A | 9 | 8 | 8 | 7 | 6 | 5 | 5 |
| F | 5 | F | E | E | D | D | C | B | B | A | 9 | 9 | 8 | 8 | 7 | 6 | 6 |
| F | 6 | F | E | E | D | D | C | C | B | B | A | 9 | 9 | 8 | 8 | 7 | 7 |
| F | 7 | F | F | E | E | D | D | C | C | B | B | A | A | 9 | 9 | 8 | 8 |
| F | 8 | F | F | E | E | D | D | C | C | C | B | B | A | A | 9 | 9 | 8 |
| F | 9 | F | F | E | E | E | D | D | C | C | C | B | B | A | A | 9 | 9 |
| F | A | F | F | E | E | E | D | D | D | C | C | C | B | B | A | A | 9 |
| F | B | F | F | F | E | E | E | D | D | D | C | C | C | B | B | B | A |
| F | C | F | F | F | E | E | E | D | D | D | D | C | C | C | B | B | B |
| F | D | F | F | F | F | E | E | E | D | D | D | D | C | C | C | B | B |
| F | E | F | F | F | F | F | E | E | E | E | D | D | D | D | C | C | C |
| F | F | F | F | F | F | F | F | F | F | F | F | F | F | F | F | F | F |

FIG. 5

DATA SELECTION SIGNAL SD

| ADRS | +0 | +1 | +2 | +3 | +4 | +5 | +6 | +7 | +8 | +9 | +A | +B | +C | +D | +E | +F |
|------|----|----|----|----|----|----|----|----|----|----|----|----|----|----|----|----|
| 400  | 4  | 4  | 4  | 3  | 3  | 3  | 3  | 2  | 2  | 2  | 2  | 1  | 1  | 1  | 1  | 0  |
| 410  | 4  | 4  | 4  | 3  | 3  | 3  | 3  | 2  | 3  | 2  | 2  | 2  | 2  | 2  | 1  | 1  |
| 420  | 4  | 4  | 4  | 4  | 4  | 3  | 3  | 3  | 3  | 3  | 3  | 3  | 3  | 2  | 2  | 2  |
| 430  | 4  | 4  | 4  | 4  | 4  | 4  | 4  | 4  | 4  | 3  | 3  | 3  | 3  | 3  | 3  | 3  |
| 440  | 4  | 4  | 4  | 4  | 4  | 4  | 4  | 4  | 4  | 4  | 4  | 4  | 4  | 4  | 4  | 4  |
| 450  | 4  | 4  | 5  | 5  | 5  | 5  | 5  | 5  | 5  | 5  | 5  | 5  | 5  | 5  | 5  | 5  |
| 460  | 4  | 4  | 5  | 5  | 5  | 5  | 5  | 5  | 5  | 5  | 5  | 5  | 6  | 6  | 6  | 6  |
| 470  | 4  | 4  | 5  | 5  | 5  | 5  | 6  | 6  | 6  | 6  | 6  | 6  | 6  | 6  | 7  | 7  |
| 480  | 4  | 4  | 5  | 5  | 5  | 6  | 6  | 7  | 6  | 6  | 7  | 7  | 7  | 7  | 8  | 8  |
| 490  | 4  | 4  | 5  | 5  | 5  | 6  | 6  | 7  | 7  | 7  | 7  | 7  | 8  | 8  | 9  | 9  |
| 4A0  | 4  | 5  | 5  | 5  | 5  | 6  | 6  | 8  | 7  | 8  | 8  | 8  | 9  | 9  | A  | A  |
| 4B0  | 4  | 5  | 5  | 5  | 7  | 6  | 7  | 8  | 8  | 8  | 8  | 9  | 9  | A  | B  | B  |
| 4C0  | 4  | 5  | 5  | 5  | 7  | 7  | 7  | 8  | 8  | 9  | 9  | A  | A  | B  | C  | C  |
| 4D0  | 4  | 5  | 5  | 5  | 7  | 7  | 7  | 8  | 9  | 9  | A  | A  | B  | B  | C  | C  |
| 4E0  | 4  | 5  | 5  | 5  | 7  | 7  | 8  | 8  | 9  | A  | A  | B  | C  | C  | D  | D  |
| 4F0  | 4  | 5  | 5  | 5  | 7  | 7  | 8  | 9  | A  | A  | B  | C  | C  | D  | E  | E  |

IMAGE DATA D0 — IMAGE DATA D1

INTERPOLATION DATA S

CONTENTS OF INTERPOLATION DATA MEMORY 13

FIG. 6

| Processing Order | Sampling Position | | Data Selection Signal SD | | Processing Order | Sampling Position | | Data Selection Signal SD | |
|---|---|---|---|---|---|---|---|---|---|
| 0 | 0.00000 → | 0.51613 | 0→ | 8 | 40 | 40.25800 | 40.77420 | 4 | C |
| 1 | 1.03226 ⇄ | 1.54839 | 0⇄ | 8 | 41 | 41.29030 | 41.80640 | 4 | C |
| 2 | 2.06452 | 2.58085 | 1 | 9 | 42 | 42.32260 | 42.83870 | 5 | D |
| 3 | 3.09677 | 3.61291 | 1 | 9 | 43 | 43.35480 | 43.87090 | 5 | D |
| 4 | 4.12903 | 4.64517 | 2 | A | 44 | 44.38710 | 44.90320 | 6 | E |
| 5 | 5.16129 | 5.67743 | 2 | A | 45 | 45.41930 | 45.93550 | 6 | E |
| 6 | 6.19355 | 6.70969 | 3 | B | 46 | 46.45160 | 46.96770 | 7 | F |
| 7 | 7.22581 | 7.74195 | 3 | B | 47 | 47.48380 | X | 7 | 0 |
| 8 | 8.25806 | 8.77421 | 4 | C | 48 | 48.00000 | 48.51610 | 8 | 0 |
| 9 | 9.29032 | 9.80647 | 4 | C | 49 | 49.03220 | 49.54840 | 0 | 8 |
| 10 | 10.32260 | 10.83870 | 5 | D | 50 | 50.06450 | 50.58060 | 1 | 9 |
| 11 | 11.35480 | 11.87100 | 5 | D | 51 | 51.09670 | 51.61290 | 1 | 0 |
| 12 | 12.38710 | 13.90320 | 6 | E | 52 | 52.12900 | 52.64510 | 2 | A |
| 13 | 13.41940 | 12.93550 | 6 | E | 53 | 53.16130 | 53.67740 | 2 | A |
| 14 | 14.45160 | 14.96770 | 7 | F | 54 | 54.19350 | 54.70960 | 3 | B |
| 15 | 15.48390 | X | 7 | 0 | 55 | 55.22580 | 55.74190 | 3 | B |
| 16 | 16.00000 | 16.51610 | 0 | 8 | 56 | 56.25800 | 56.77420 | 4 | C |
| 17 | 17.03230 | 17.54840 | 0 | 8 | 57 | 57.29030 | 57.80640 | 4 | C |
| 18 | 18.06450 | 18.58060 | 1 | 9 | 58 | 58.32250 | 58.83870 | 5 | D |
| 19 | 19.09680 | 19.61290 | 1 | 9 | 59 | 59.35480 | 59.87090 | 5 | D |
| 20 | 20.12900 | 20.64520 | 2 | A | 60 | 60.38710 | 60.90320 | 6 | E |
| 21 | 21.16130 | 21.67740 | 2 | A | 61 | 61.41930 | 61.93540 | 6 | E |
| 22 | 22.19350 | 22.70970 | 3 | B | 62 | 62.45160 ⇄ | 62.96770 | 7⇄ | F |
| 23 | 23.22580 | 23.74190 | 3 | B | 63 | 63.48380 → | X | 7→ | 0 |
| 24 | 24.25810 | 24.77420 | 4 | C | | | | | |
| 25 | 25.29030 | 25.80640 | 4 | C | | | | | |
| 26 | 26.32260 | 26.83870 | 5 | D | | | | | |
| 27 | 27.35480 | 27.87100 | 5 | D | | | | | |
| 28 | 28.38710 | 28.90320 | 6 | E | | | | | |
| 29 | 29.41930 | 29.93550 | 6 | E | | | | | |
| 30 | 30.45160 | 30.96770 | 7 | F | | | | | |
| 31 | 31.48390 | X | 7 | 0 | | | | | |
| 32 | 32.00000 | 32.51610 | 8 | 0 | | | | | |
| 33 | 33.03230 | 33.54840 | 0 | 8 | | | | | |
| 34 | 34.06450 | 34.58060 | 1 | 9 | | | | | |
| 35 | 35.09630 | 35.61290 | 1 | 9 | | | | | |
| 36 | 36.12900 | 36.64520 | 2 | A | | | | | |
| 37 | 37.16130 | 37.67740 | 2 | A | | | | | |
| 38 | 38.19350 | 38.70970 | 3 | B | | | | | |
| 39 | 39.22580 | 39.74190 | 3 | B | | | | | |

CONTENTS OF INTERPOLATION DATA-SELECTION SIGNAL MEMORY 16

STEP →

| ADRS | +0 | +1 | +2 | +3 | +4 | +5 | +6 | +7 | +8 | +9 | +A | +B | +C | +D | +E | +F |
|---|---|---|---|---|---|---|---|---|---|---|---|---|---|---|---|---|
| 2D00 | 01 | 81 | 01 | 81 | 11 | 91 | 11 | 91 | 21 | A1 | 21 | A1 | 31 | B1 | 31 | B1 |
| 2D10 | 41 | C1 | 41 | C1 | 51 | D1 | 51 | D1 | 61 | E1 | 61 | E1 | 71 | F1 | 71 | 00 |
| 2D20 | 01 | 81 | 01 | 81 | 11 | 91 | 11 | 91 | 21 | A1 | 21 | A1 | 31 | B1 | 31 | B1 |
| 2D30 | 41 | C1 | 41 | C1 | 51 | D1 | 51 | D1 | 61 | E1 | 61 | E1 | 71 | F1 | 71 | 00 |
| 2D40 | 01 | 81 | 01 | 81 | 11 | 91 | 11 | 91 | 21 | A1 | 21 | A1 | 31 | B1 | 31 | B1 |
| 2D50 | 41 | C1 | 41 | C1 | 51 | D1 | 51 | D1 | 61 | E1 | 61 | E1 | 71 | F1 | 71 | 00 |
| 2D60 | 01 | 81 | 01 | 81 | 11 | 91 | 11 | 91 | 21 | A1 | 21 | A1 | 31 | B1 | 31 | B1 |
| 2D70 | 41 | C1 | 41 | C1 | 51 | D1 | 51 | D1 | 61 | E1 | 61 | E1 | 71 | F1 | 71 | 00 |
| 2D80 | 01 | B1 | 01 | B1 | 51 | D1 | 41 | D1 | 41 | 91 | 11 | A1 | 21 | A1 | 21 | A1 |
| 2D90 | 31 | E1 | 31 | E1 | 31 | 91 | 71 | C1 | 71 | C1 | 41 | 00 | 50 | A1 | 50 | D1 |
| 2DA0 | 61 | C1 | 41 | F1 | 61 | 00 | 21 | F1 | 21 | F1 | 81 | 00 | 01 | 81 | 01 | 81 |
| 2DB0 | 71 | F1 | 71 | D1 | 71 | 00 | 51 | A1 | 51 | A1 | 61 | B1 | 31 | E1 | 31 | E1 |
| 2DC0 | 21 | C1 | 41 | C1 | 21 | B1 | 01 | B1 | 21 | D1 | 61 | E1 | 61 | E1 | 61 | B1 |
| 2DD0 | 51 | F1 | 71 | F1 | 51 | E1 | 00 | E1 | 50 | E1 | 31 | 91 | 31 | 91 | 31 | 91 |
| 2DE0 | 71 | A1 | 21 | A1 | 21 | B1 | 31 | B1 | 31 | E1 | 31 | C1 | 61 | C1 | 61 | C1 |
| 2DF0 | 51 | D1 | 51 | D1 | 61 | E1 | 61 | E1 | 61 | F1 | 71 | F1 | 71 | F1 | 71 | 00 |

124/64 ⎨ rows 2D00–2D70
125/64 ⎨ rows 2D80–2DF0

DATA SELECTION SIGNAL SD   PROCESSING-TIMING SIGNAL TD

INVALID DATA

FIG. 8

| Processing Order | Sampling Position | | Data Selection Signal SD | | Processing Order | Sampling Position | | Data Selection Signal SD | |
|---|---|---|---|---|---|---|---|---|---|
| 0 | 0.00000 | X | 0 | 0 | 40 | 40.72730 | X | B | 0 |
| 1 | 1.93939 | X | F | 0 | 41 | X | X | 0 | 0 |
| 2 | X | X | 0 | 0 | 42 | 42.66670 | X | A | 0 |
| 3 | 3.87879 | X | E | 0 | 43 | X | X | 0 | 0 |
| 4 | X | X | 0 | 0 | 44 | 44.06810 | X | 9 | 0 |
| 5 | 5.81818 | X | D | 0 | 45 | X | X | 0 | 0 |
| 6 | X | X | 0 | 0 | 46 | 46.54550 | X | 8 | 0 |
| 7 | 7.75758 | X | C | 0 | 47 | X | X | 0 | 0 |
| 8 | X | X | 0 | 0 | 48 | 48.48490 | X | 7 | 0 |
| 9 | 9.69697 | X | B | 0 | 49 | X | X | 0 | 0 |
| 10 | X | X | 0 | 0 | 50 | 50.42430 | X | 6 | 0 |
| 11 | 11.63640 | X | A | 0 | 51 | X | X | 0 | 0 |
| 12 | X | X | 0 | 0 | 52 | 52.36370 | X | 5 | 0 |
| 13 | 13.57580 | X | 9 | 0 | 53 | X | X | 0 | 0 |
| 14 | X | X | 0 | 0 | 54 | 54.30310 | X | 4 | 0 |
| 15 | 15.51520 | X | 8 | 0 | 55 | X | X | 0 | 0 |
| 16 | X | X | 0 | 0 | 56 | 58.24240 | X | 3 | 0 |
| 17 | 17.45450 | X | 7 | 0 | 57 | X | X | 0 | 0 |
| 18 | X | X | 0 | 0 | 58 | 58.18180 | X | 2 | 0 |
| 19 | 19.39390 | X | 6 | 0 | 59 | X | X | 0 | 0 |
| 20 | X | X | 0 | 0 | 60 | 60.12120 | X | 1 | 0 |
| 21 | 21.33330 | X | 5 | 0 | 61 | X | X | 0 | 0 |
| 22 | X | X | 0 | 0 | 62 | 62.06060 | X | 0 | 0 |
| 23 | 23.27270 | X | 4 | 0 | 63 | X | X | 0 | 0 |
| 24 | X | X | 0 | 0 | | | | | |
| 25 | 25.21210 | X | 3 | 0 | | | | | |
| 26 | X | X | 0 | 0 | | | | | |
| 27 | 27.15150 | X | 2 | 0 | | | | | |
| 28 | X | X | 0 | 0 | | | | | |
| 29 | 29.09090 | X | 1 | 0 | | | | | |
| 30 | X | X | 0 | 0 | | | | | |
| 31 | 31.03030 | X | 0 | 0 | | | | | |
| 32 | 32.96970 | X | F | 0 | | | | | |
| 33 | X | X | 0 | 0 | | | | | |
| 34 | 34.90910 | X | E | 0 | | | | | |
| 35 | X | X | 0 | 0 | | | | | |
| 36 | 36.84850 | X | D | 0 | | | | | |
| 37 | X | X | 0 | 0 | ← INVALID DATA | | | | |
| 38 | 38.78790 | X | C | 0 | | | | | |
| 39 | X | X | 0 | 0 | | | | | |

| SCALE RATIO M | INITIAL WRITING ADDRESS | INITIAL READING ADDRESS |
|---|---|---|
| 32/64 | 1024 | 0 |
| 33/64 | 992 | 0 |
| 34/64 | 960 | 0 |
| ... | ... | ... |
| 64/64 | 0 | 0 |
| 65/64 | 0 | 32 |
| ... | ... | ... |
| 126/64 | 0 | 1984 |
| 127/64 | 0 | 2016 |
| 128/64 | 0 | 2048 |

FIG. 21

| RECORDING RESOLUTION / DESIGNATED SCALE RATIO | 16 DOTS / mm | 12 DOTS / mm | 8 DOTS / mm |
|---|---|---|---|
| 2 | 128 / 64 | 96 / 64 | 64 / 64 |
| ... | ... | ... | ... |
| 1.0 | 64 / 64 | 48 / 64 | 32 / 64 |
| ... | ... | ... | ... |
| 0.5 | 32 / 64 | 24 / 64 | 16 / 64 |

RECTIFIED SCALE RATIO SIGNAL

FIG. 27

| SCALE RATIO M | INITIAL WRITING ADDRESS | INITIAL READING ADDRESS |
|---|---|---|
| 32/64 | 0 | 184 |
| 33/64 | 0 | 190 |
| 34/64 | 0 | 196 |
| ⋮ | ⋮ | ⋮ |
| 64/64 | 0 | 368 |
| ⋮ | ⋮ | ⋮ |
| 126/64 | 0 | 724 |
| 127/64 | 0 | 730 |
| 128/64 | 0 | 736 |

FIG. 29

| SCALE RATIO M | INITIAL WRITING ADDRESS | INITIAL READING ADDRESS |
|---|---|---|
| 32/64 | 1208 | 0 |
| 33/64 | 1182 | 0 |
| 34/64 | 1156 | 0 |
| ⋮ | ⋮ | ⋮ |
| 64/64 | 368 | 0 |
| ⋮ | ⋮ | ⋮ |
| 126/64 | 0 | 1260 |
| 127/64 | 0 | 1286 |
| 128/64 | 0 | 1312 |

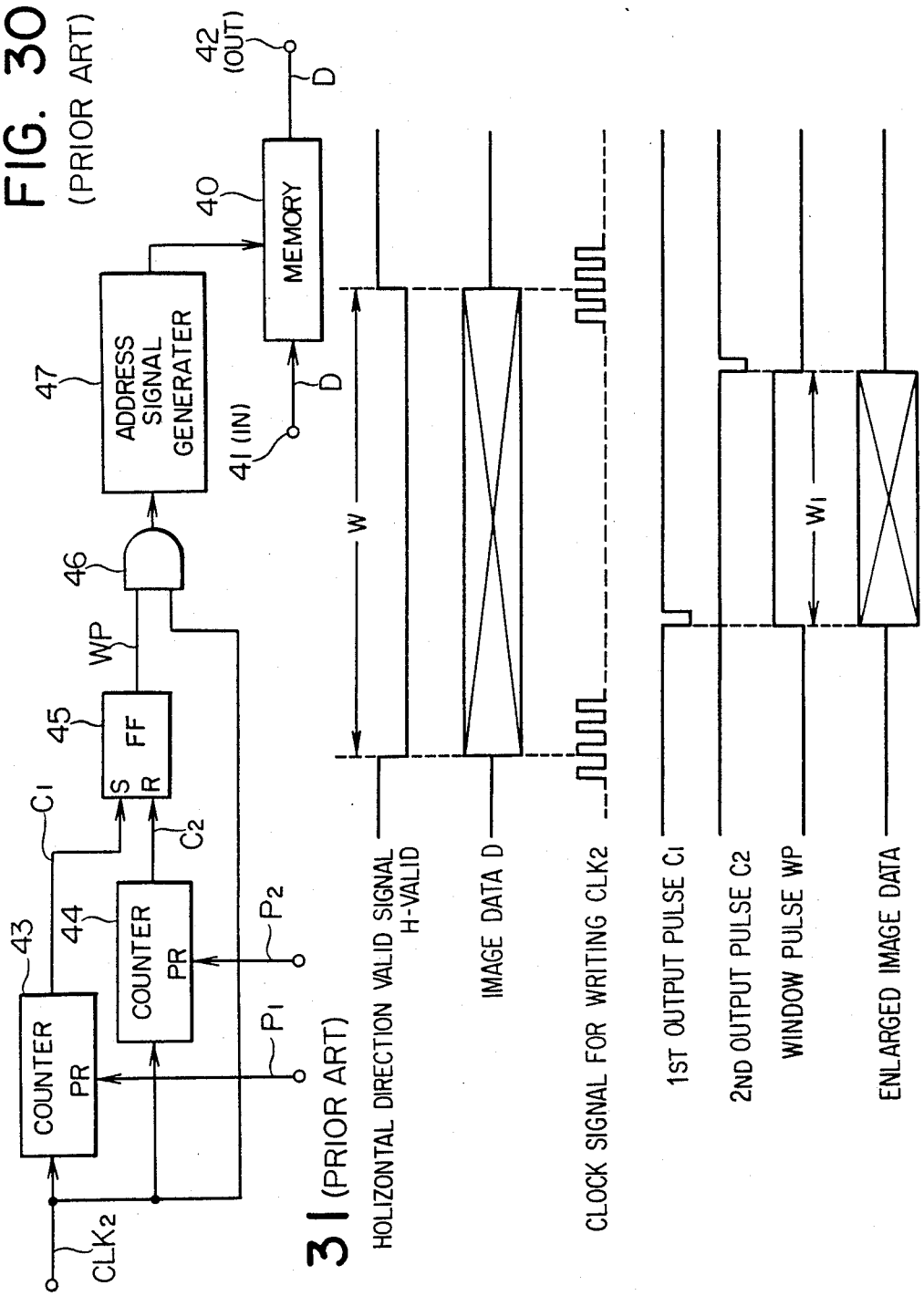

33-a REDUCING 33-b SAME SCALE RATIO 33-c ENLARGING

IMAGE PROCESSING SYSTEM WITH CAPABILITY OF ENLARGING AND REDUCING OPERATIONS

This application is a continuation of application Ser. No. 07/277,460, filed Nov. 23, 1988 which was a Continuation of Ser. No. 005,553 filed Jan. 20, 1987 now abandoned.

BACKGROUND OF THE INVENTION

The present invention relates to an image processing device to enlarge and reduce images by an interpolation method.

Image recorders to record an original image through enlarging or reducing operation have been developed. When enlarging or reducing an image to be recorded, with such image recorders having a solid state image sensor, such as a charge coupled device (CCD) or the like, to read an original image which is converted into electrical image signals, the spaces among pixels read out by a solid state image sensor on an original image are continuously compensated so as to produce image signal having near-curvilinear waveform, which is sampled at varied sampling invervals corresponding to required enlarging or reducing ratio, thus providing an enlarged or reduced image.

However, such an arrangement disadvantageously involves many and complicated arithmetic operations to fill data into the spaces among pixels on a solid state image sensor, resulting in complicated circuitry. Additionally, there is a conventionally known method to modify the frequency of a reading signal, that is, a transfer clock signal, for an original image which has been read by a solid state image sensor (Japanese Patent Publication Open to Public Inspection, hereinafter referred to as Japanese Patent O.P.I. Publication, No. 146358/1981). More specifically, in the case of an enlargement recording operation, a period of transfer clock signal is set larger than that of the same scale ratio recording operation which records the image in same size with the original size thereof. On the contrary, in the case of reducing recording operation, the period is set smaller than that of the same scale ratio recording operation. However, especially in the case of an enlarging operation, such an arrangement fails to provide interpolation data which compensates data between the arbitrary pixels. With the above-mentioned method, as the transfer clock signal to be used for enlarging or reducing recording operation is generated based on the reference clock to be used in the recording operation with the same scale ratio, a circuit for generating such a transfer clock signal is required. Additionally, modifying the period of transfer clock signal for enlarging or reducing operation necessitates controlling the exposure (time), and a circuit for this purpose. Furthermore, as an image is recorded employing the image data sampled in compliance with the transfer clock signal having a specified frequency, in order to carry out enlarging or reducing operation in accordance with the above-mentioned method, the enlargement of, for example, an oblique line emphasizes ruggedness and deteriorates smoothness, resulting in disadvantageously poor image quality.

In the case where a photoelectric conversion element such as a CCD or the like is utilized as an image reading means in an image recording device which is capable of enlarging and reducing an original image, some methods provide enlarged or reduced image signals by adding or reducing appropriate image data to or from the pixel data read on an original image in accordance with an enlarging or reducing ratio.

FIG. 30 is a block diagram illustrating the principal area of one processing system, employed to carry out enlarging and reducing operation, which is incorporated into such an image processing device.

In this figure, numeral 40 denotes a memory for image data, and image data read by an image reading means is fed into an input terminal 41 of memory 40, after being processed for enlargement or reduction. Output image data outputted from an output terminal 42 is transferred to a recorder or the like, which reproduces an enlarged or reduced image.

In enlarging and reducing operations, the recording width of a recorder restricts the amount of image data being fed into the memory 40. In this case, the timing signal, which is generated at the address signal generator 47 and is fed into the memory 40, is controlled in accordance with either an enlarging or reducing operation.

To achieve this, preset-capable first and second counters, 43 and 44, are incorporated. When a clock signal CLK 2 (31-c in FIG. 31) having a predetermined frequency has been counted until the preset value P1 of the counter 43 and the preset value P2 of the counter 44 are reached, the first and second output pulses C1 and C2 (31-d and 31-e in FIG. 31) are generated. The first output pulse C1 sets a flipflop 45, and the second output pulse C2 resets the flipflop 45, generating a window pulse WP shown by F in the figure. Such a window pulse WP is supplied as a gate pulse into a gate circuit 46, and a clock signal CLK2 is supplied as long as the duration W1 of the window pulse WP into the address signal generator 47. Incidentally such a clock signal CLK2 is a clock signal synchronous to the enlarged or reduced image data.

As a result, as the address data to be fed into the memory 40 is generated for the duration W1, the image data (31-g in FIG. 31) corresponding with the duration W1, among the image data (31-b in FIG. 31) restricted by a horizontal direction valid signal (H-VALID) shown by 31-a in FIG. 31, is written into the memory 40.

Accordingly, by varying the preset values P1 and P2 in accordance with the enlarging or reducing scale ratio, the duration W1 of the window pulse WP varies in proportion to the variation in the scale ratio, this in turn defines the amount of the image data to be written into the memory 40.

In the case of reducing operation, the processing is carried out with the duration of the window pulse WP being equal to that of the horizontal direction valid signal (H-VALID). Contrary, in the case of enlarging operation, as the amount of image data increase, the duration of the window pulse is set shorter beforehand than that of the horizontal direction valid signal (H-VALID) so as to decrease the amount of data.

Incidentally, such a conventional image processing system, mentioned above, causes the following disadvantages.

In other words, with a system constitution in FIG. 30, the first address (address 0) is always designated as the initial address from where the data is to be written into, regardless of the scale ratio, though the amount of the image data to be written into the memory 40 is limited in compliance with the enlarging or reducing scale ratio. For this reason, especially when such a constitution is incorporated into an image processing system whose reading or recording device reads or records an original draft by referring to the center of a recording paper, the image to be recorded may be, depending on the scale ratio, recorded outside the recording zone of the recording paper.

For example, assuming that W in FIG. 32 is the maximum readable width of an image reading means, an image can be recorded as shown in FIG. 33 at the same scale ratio mode with the system wherein the image data of an original draft 52 is read out by using the center line l of a draft table 51 and the image is recorded based on the center line l. However, in the case of reducing operation, such a recorded image appears as shown by 33-a in FIG. 33.

This is because the initial writing address on the memory 40, that is address 0, corresponds with a initial writing address in an output device (a recorder such as a laser printer). Consequently, if a recording paper 53 to record an image is small-sized, the reduced image may not be correctly recorded on the paper, because an image may overflow from the recording-capable zone on the paper.

Even if a recording paper 53 has a larger size, the reduced image is disadvantageously recorded as being unexpectedly located to one corner of the recording paper 53.

Additionally, the blank area of an original draft is also enlarged in the enlarging operation, and, the resultant enlarged image appears as shown by 33-c in FIG. 33. For this reason, a needed area of image may fail to be recorded on a specific recording paper 53.

To solve such disadvantages, it is possible to conceive a method wherein the image data with enlarging or reducing data incorporated is temporarily stored in an output buffer circuitry, then, transferred to and stored in a memory at final stage or fed into an output device which records the image.

As can be understood from the reasons described later, such a method can solve, by controlling the timing for writing the image data into or reading out such data from the output buffer circuitry in correspondence with the enlarging or reducing scale ratio, the disadvantages such as the recording of a reduced image offset to one side of a recording paper and the recording of an enlarged image with its part missing.

However, the incoporation of such an output buffer circuitry poses still another disadvantage.

In other words, an output buffer circuitry sometimes employs a line memory or the like to store the image data. In this case, with such a line memory, the data in line memory may uncertainly become either "1" or "0" during a rising stage of an operation for example when power is turned on for an image processing device. That is, the probability is 50%.

Consequently, if the data is in all clear ("0") status, there is no specific disadvantage. However, if not so, the inability to identify the original image data may render the reading of correct image data impossible.

Similar problems may happen even in modification of scale ratio. That is, in the case where the scale ratio is changed to smaller value, for example, from the enlarging mode to the reducing mode, the former image data remains unchanged in the line memory. In such a case, again it is impossible to distinguish the newly written image data from the former image data, posing a new disadvantage similar to the above-mentioned one.

Therefore it is the object of the present invention to provide, in order to eliminate the above-mentioned conventional disadvantages, an image processing having a capability of enlarging and reducing operations and being able to correctly write image data even if a line memory is in an unstable status.

Naturally, according to the invention, a reduced image is not recorded at one corner on a reducing paper, or, a part of an image to be recorded is not missing.

Additionally, a conventional image processing system is such that the reading resolution of an image reading means is designed to conform to the recording resolution of a recording means for the image data having been read.

However, as various recording systems have become more popular recently, a recording means having a recording resolution different from a reading resolution is sometimes connected for use with such a system. In such an image processing system, the scale ratio designation conducted externally is exclusively carried out on an image reading means. Therefore, the difference between the reading resolution and the recording resolution causes the failure in correct recording of an image in the designated scale ratio.

For example, when the reading resolution is 16 dots/mm and the recording resolution is 8 dots/mm, the recorded image is enlarged twice as large as the original image, even if the same scale ratio is designated externally. On the other hand, when the reading resolution is 8 dots/mm and the recording resolution is 16 dots/mm, the recorded image is reduced to half the original image.

With such a conventional system, as no means is provided to solve such disadvantages, it is necessary to preset a designated scale ratio corresponding to the relevant solution in order to allow the original image to be recorded correctly in the designated scale ratio, when the reading resolution and the recording resolution are different.

However, such a modification is extremely cumbersome and sometimes causes errors.

Therefore, it is the object of the present invention to propose an enlarging/reducing capable image processing device which can provide the recorded image in accordance with the specified scale ratio, even though a recording means having the recordiing resolution different from the reading resolution is connected to the device in order to process an image.

Among image recording devices which can enlarge or reduce an original image, in image processing system is available, wherein the image data outputted from the image processing device is transferred to a host computer in order to display the data on a display device or the like provided in the host computer.

Incidentally, with such a conventional image processing system, various image processing operations are executed based on the instructions from the host computer. Additionally, with this type of image processing system, a plurality of recording means are provided in the output device side which is connected to the image processing device, wherein the most suitable recording means may be selected by the instructions from the host computer.

In such an image processing system, the scale ratio instructions from the host computer are exclusively directed to the image reading means. Accordingly, when the reading resolution differs from the recording resolution, the image is not correctly recorded, even if the image is processed in accordance with the designated scale ratio.

Therefore, it is the object of the invention to provide, in regard to the above-mentioned image processing systems, an enlarging/reducing capable image processing system which can produce a recorded image of the size in accordance with the scale ratio designated from the host computer even if the image processing is executed by connecting a recording means which has the recording resolution different from the recording resolution.

SUMMARY OF THE INVENTION

The present invention was made in view of the above-mentioned disadvantages. Accordingly, it is the primary object of the invention to provide the high-quality enlarged or reduced image by employing a simple circuit configuration which incorporates interpolation method, and, additionally, to enable the modification of pixel density. To fullfill such the object, the system of the invention is so constituted that the interpolation data is provided to compensate for a gap data between pixels in the entire image data and that the interpolation data are read out based on the interpolation data selection signal which is outputted in accordance with predetermined conditions.

An output buffer circuit is provided following an image processing circuit where the enlarging or reducing operation is carried out. The initial writing or reading address in line memories provided in the output buffer circuit is modified in accordance with either the enlarging or reducing operation, and, at the same time, the line memory is cleared within the time period while reading is carried out on the invalid zone during the reading operation.

Furthermore, in the enlarging/reducing capable image processing device, according to the invention, which enlarges or reduces an image by using the image data readout obtained by photoelectrically converting image information, the effective reading resolution of the image reading means is modified in accordance with the recording resolution of the recorder.

BRIEF DESCRIPTION OF THE DRAWING

FIGS. 1-a and 1-b are the schematic diagrams showing the outline of an enlargement/reduction capable image recorder.

FIG. 5 is a diagram showing another example of interpolation data set employed likewise.

FIG. 6 exemplifies data selection used in image enlarging operation.

FIG. 7 is a data table illustrating a data selection signal and a processing-timing signal corresponding to FIG. 6.

FIG. 8 is a diagram showing one set of data for a data selection signal employed in the image reducing operation.

FIGS. 16, 27 and 29 respectively illustrate initial writing address or the like.

FIG. 21 is a table showing the correlation between the designated scale ratio and the adjusted scale ratio which is determined by the reading resolution.

FIG. 30 is a block diagram illustrating one example of the principal area of a conventional enlarging/reducing capable image processing device.

FIG. 31 is a waveform diagram used to describe the operation of the similar device.

DETAILED DESCRIPTION OF THE INVENTION

The following is a detailed description of one example of an enlarging/reducing capable image processing system, according to the invention, wherein the system is applied in the device where the processing is carried out by referring to the center line 1 as a reference line.

FIG. 1-a is the schematic diagram of an image recording system employing an image processing device according to the invention. Numeral 401 denotes an image reader which reads image information on an original draft or the like by employing a photoelectric conversion element such as a CCD or the like and converts it into electrical signals. The reader further converts the analog signals into digital signals, and after carrying out shading rectification or the like the reader outputs the digital signals as the image data having 16 tone levels (0~F as hexadecimal notation). Numeral 402 is an image processing device which enlarges or reduces the image data at a scale ratio which is, for example, designated externally. Numeral 403 denotes a recorder, such as a laser printer, LED printer or the like, which records an image by using the data having undergone image-processing.

Figure 2:
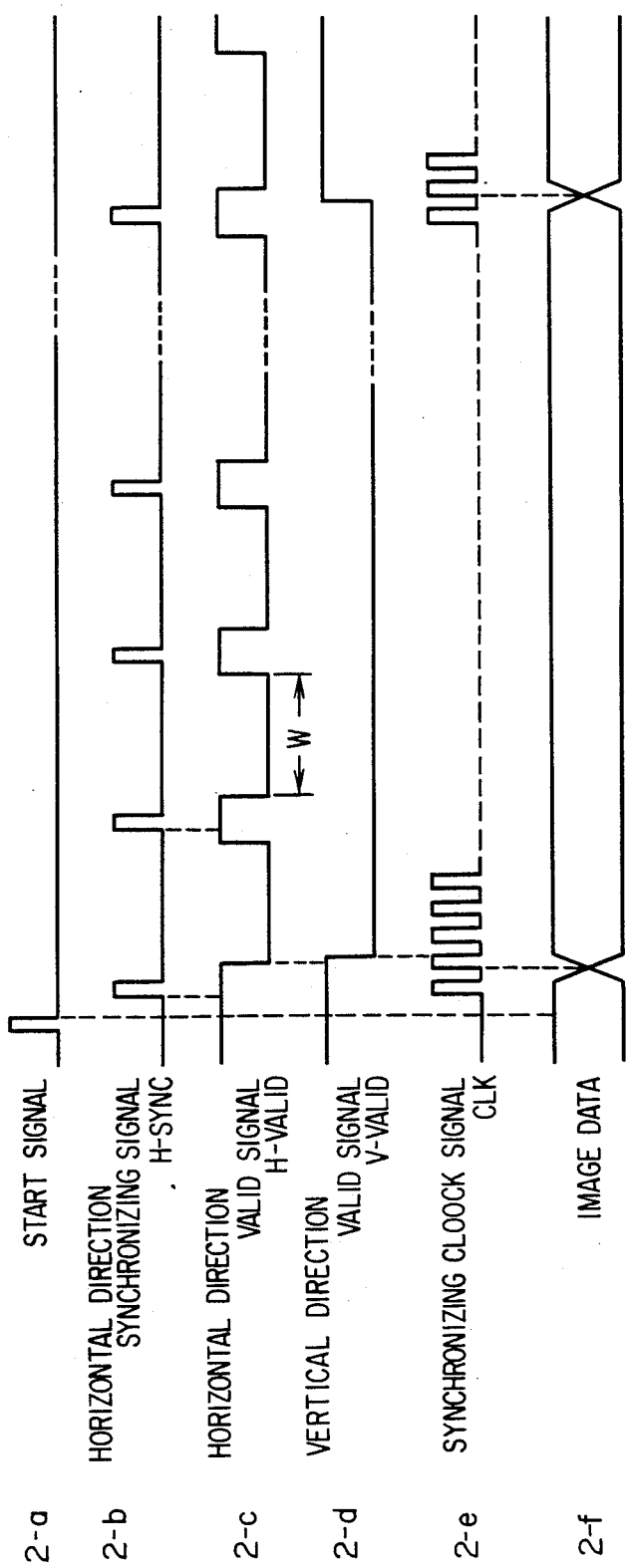
FIG. 2 is the waveform diagram used for the description of functions of such an recorder.

In FIG. 1-b, the image information of an original draft 52 is read with an image reading means 60 such as a CCD or the like and converted into analog image signals. FIG. 2 illustrates the interrelation between the image data and various timing signals. The horizontal direction valid signal (H-VALID) (2-c in the figure) corresponds to the maximum draft reading width W of the CCD 60. The image data represented by 2-f in the figure is read out, being synchronous to the synchronizing clock signal CLK (2-e in the figure).

The image signal generated at the CCD 60 is converted by the A/D converter 61 into, for example, the image data having 16 tone levels (0~F). The image data is compensated for shading at the compensating circuit for shading 62. This arrangement is for compensating the shading caused by uneven sensitivity on the CCD 60, misaligned optical system, or uneven illumination from an irradiation lamp. For this reason, the data (for one line) of an even density plate (a white plate or the like) provided in the non-image zone of the reading device are read by the CCD 60 prior to the data reading on the original draft information, and the data readout is stored as the uneven data in the memory 63. Such uneven data for compensating shading is together with the image data to be processed are fed into the compensating circuit 62, so as to execute for shading on each pixel.

The image data, having received compensating for shading, is transferred to the image processing circuit 2, where the real-time enlarging or reducing processing is carried out in accordance with the designated scale ratio. The data defining the scale ratio is outputted from the main control circuit 70.

The image data having undergone the image processing is binary coded at a binary coding circuit 23 by referring to the threshold data (for example, the dither matrix data) stored in a threshold value table 69. The binary coded image data is fed into the output buffer circuit 90. The output buffer circuit 90 is provided in order to control the timing for writing or reading the image data, and is controlled based on the initial writing or reading address data outputted from the main control circuit 70.

The image data outputted from the output buffer circuit 90 is finally transferred to the image memory 64 which stores the image data, or directly supplied to an output device, where the image is recorded as required. As an output device 65, the recorder incorporating a laser printer, LED printer or the like is available.

Numeral 71 represents an operation key for externally setting a scale ratio. Numeral 150 is a designating means for reading-resolution. When the reading-resolution of the CCD 60 differs from the recording-resolution of a recorder provided on the output device 65, the designating means for reading-resolution is incorporated in order to adjust the reading-resolution to the recording-resolution.

The main control circuit 70 automatically adjusts the scale ratio based on the externally designated scale ratio signal as well as the reading-resolution data in order to record the image in accordance with the designated scale ratio. The adjusted scale ratio signal is transmitted to the above-mentioned image processing circuit 2. The designating means for reading-resolution is described later.

Additionally, numeral 66 denotes a reference clock generating circuit.

The reference clock signal outputted from the reference clock generating circuit 66 is transmitted to a timing control circuit 67, where various timing signals necessary for the image processing are generated. More specifically, in addition to timing signals (a transfer signal or the like) for driving CCD 60, the generated signals include a timing signal for driving an address signal generator 68 which controls the memory 63, a timing signal for the image processing circuit 2 and a timing signal to the threshold value table 69 which controls the binary coding.

Figure 3:
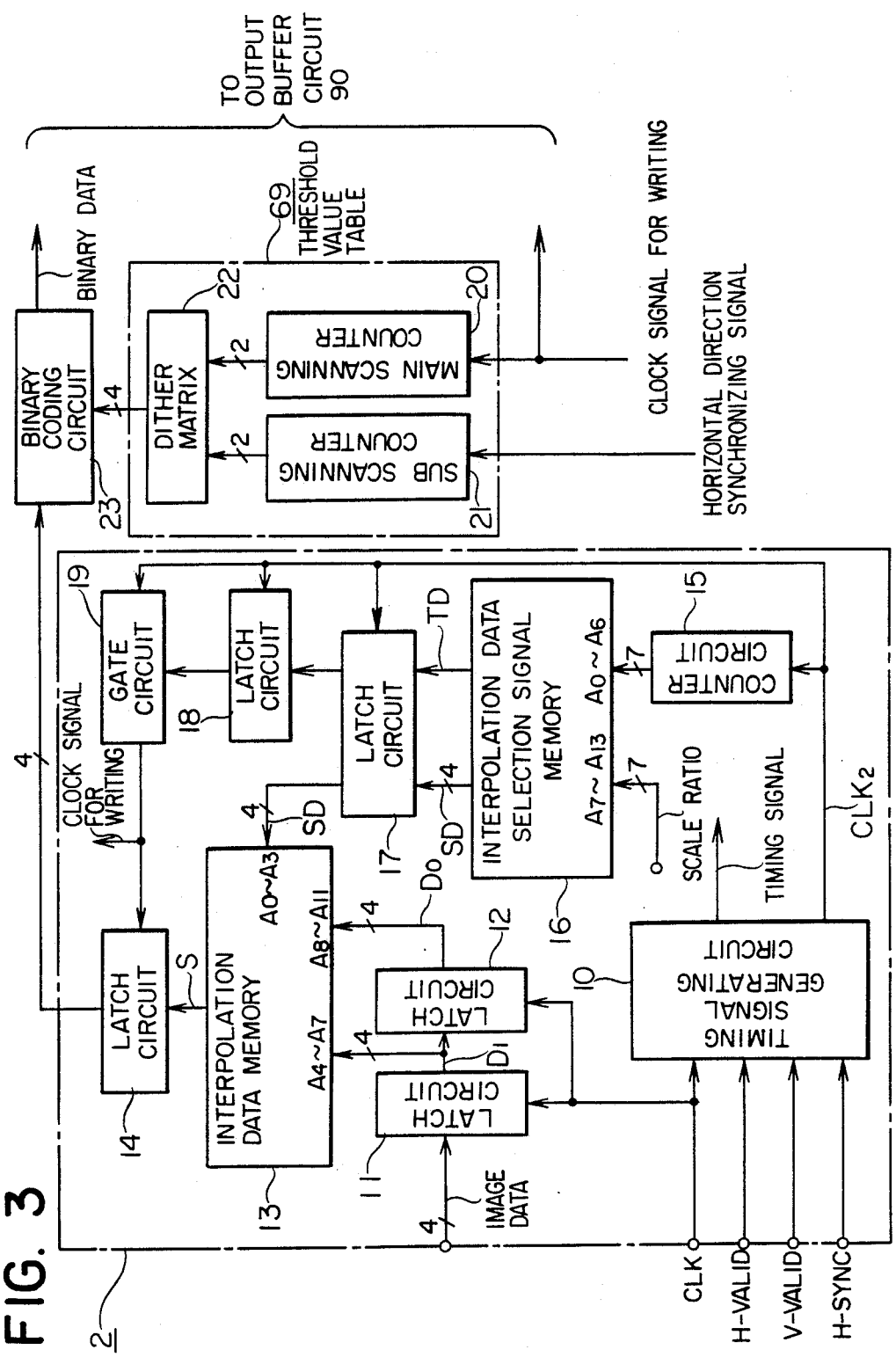
FIG. 3 is a block diagram illustrating one example of an image processing circuit.

FIG. 3 is a block diagram illustrating one example of the image processing circuit 2.

This example is so arranged that the enlarging or reducing operation can be executed every 1/64 in increments from the scale ratios 0.5 (32/64) to 2.0 (128/64).

Figure 32:
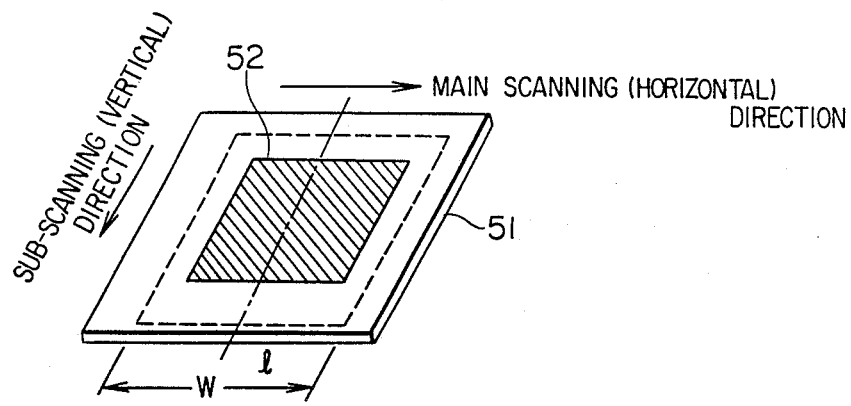
FIG. 32 is a schematic diagram of an image reading system.
Figure 33:
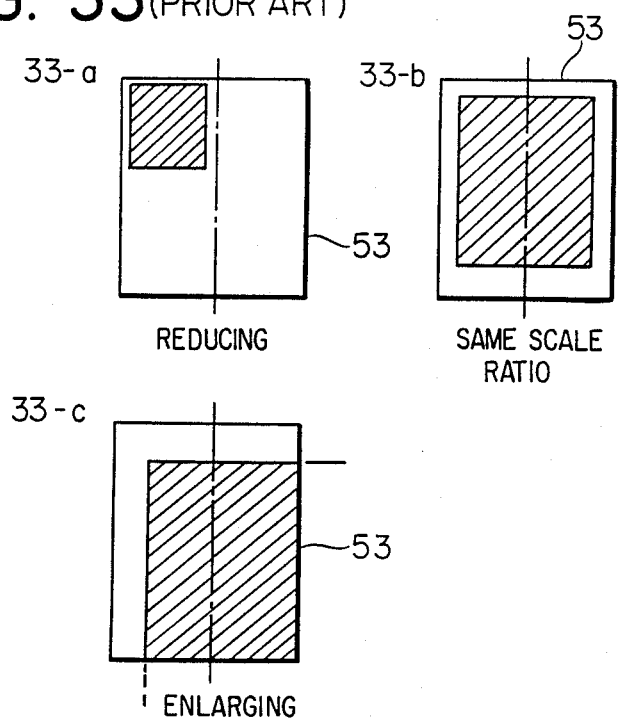
FIG. 33 indicate diagrams showing the status of recorded images.

Principally, according to the invention, an interpolation processing is so applied that an image data is added in the enlarging operation and the image data is selectively reduced in the reducing operation. The enlargement or reduction in the main scanning direction shown in FIG. 32 is effected by the electrical signal processing. The enlargement or reduction in the sub-scanning direction is carried out by varying the scanning speed in relation to the photoelectric conversion element or image information while keeping the exposure of the similar element unchanged.

The slowdown in scanning rate along the sub-scanning direction enlarges the original image, and, the speedup reduces the image.

In FIG. 3, the timing signal generating circuit 10 is so arranged to generate the timing signals, one of which controls the processing timing of the image processing circuit 2 as a whole. The synchronizing check signal (CLK), the horizontal direction valid signal (H-VAL), the vertical direction valid signal (V-VAL) and the horizintal direction synchronizing signal (H-SYNC) are fed into the timing signal generating circuit 10 in the same manner as for the CCD 60.

In addition to the timing signal, mentioned above, the timing signal generating circuit 10 at the same time outputs the clock signal CLK2 having twice as large frequency value compared to the synchronizing clock signal CLK, in order to cope with the real-time enlarging operation with the enlarging ratio up to 2.0 as one example.

A series of image data outputted from the CCD 60 and having 16 tone levels are fed into two latch circuits 11 and 12 arranged in series, wherein the image data D1 and D0 corresponding with two adjacent pixels, among 4-bit-configured image data, are latched at the timing of the synchronizing clock signal. These latched data are used as the address data for the interpolation data memory 13.

The interpolation data memory 13 stores a data table which consists of image data calculated from the pair of image data of the (which is, hereinafter, called the adjacent pixels interpolation datas) capable of being addressed based on the pair of adjacent image data, and comprises a ROM or the like.

As the address data for the interpolation data memory 13, the data selection signal SD, in addition to the above-mentioned single pair of latched data D0 and D1, is utilized.

The data selection signal SD is employed to produce the address data to determine which data should be used as an interpolation data among the data group selected by a pair of latched data D0 and D1.

The data selection signal SD is designated, as described later, by the preselected scale ratio for the enlarging or reducing operation.

Figure 4:
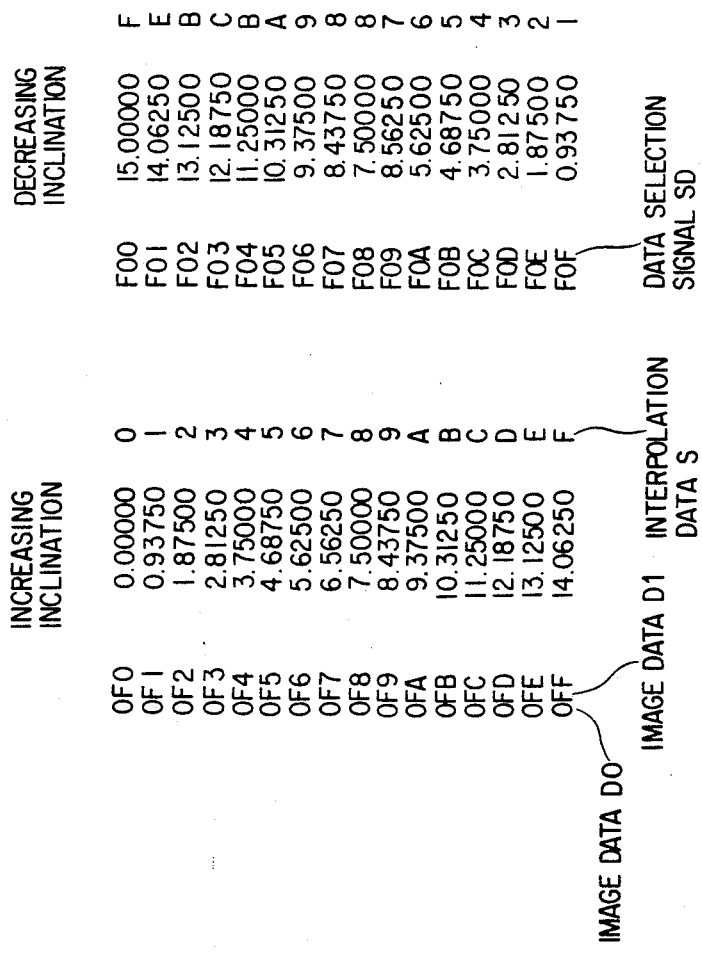
FIG. 4-a and 4-b are diagrams showing an example of interpolation data set employed in image enlarging operation.

FIG. 4-a shows one example of the interpolation data S designated by the latched data D0 and D1 as well as the data selection signal SD.

The figure illustrates the theoretical values (represented by five decimal positions) for each step as well as the actually stored interpolation data values S in the two cases, that is, the increasing inclination and the decreasing inclination, by assuming that D0=0 and D1=F.

As shown in FIG. 4-a and 4-b, the interpolation data (4 bits) S is outputted in 16 tone levels. The latched image data D0 and D1 employed in this example respectively have 16 tone levels, which means the interpolation data table includes 16×16=256 data blocks as shown in FIG. 4-b.

Actually, the interpolation data S is stored as exemplified in FIG. 5. Here, the example data shows only the case where D0=4 and D1=0∼F.

In FIG. 5, ADRS means the base address. This figure illustrates the correlation, between the data selection signal SD (the data, 0 through F, arranged horizontally) and the interpolation data S to be outputted, when D0=4 and D1 takes levels from 0 through F. The value of address data ADRS together with the values of data selection signal SD found in the corresponding horizontal line constitutes the actual address used in the interpolation memory 13.

For example, the case where D0=4 and D1=F, when the data selection signal SD=0, 4F0 is addressed and then 4 is outputted as the interpolation data S, and while SD=F, 4FF is addressed and then E is outputted.

The interpolation data S outputted from the interpolation memory 13 is latched at the latch circuit 14.

In the meanwhile, numeral 16 denotes the interpolation data selection signal memory where the data for generating the data selection signal SD is stored. In this memory, too, a data table is employed.

FIG. 6 illustrates a portion of the data selection data signal SD employed in the image enlarging operation. The exemplified data is based on the enlarging ratio M set at 124/64. The enlarging scale ratio can be designated in 1/64 increments. In the figure, the symbol * denotes missing data.

In this way, where scale ratios are set with 1/64 increments, as shown in FIG. 6, it is preferred to set 64 as the number of image data to be read and processed during one cycle of an interpolating pattern. If the enlarging ratio is 124/64, since the interpolation data to be outputted during the one cycle are 124 dots, the sampling interval for addressing the interpolation data memory 13 is 64/124 (=0.51613) in terms of reading interval of the original image. Accordingly, the correlation between the sampling position (theoretical value) in relation to the phase of processing order in the one cycle and the data selection signal SD to be referred then is shown in the figure.

In regard to the data selection signal SD at the phase "0" in the processing order, the data (0) in the left column is the leading data selection signal at the sampling position (0.00000), while the data (8) in the right column is the following data selection signal SD at the sampling position (0.51613). Such data selection signals SD in a pair differs from each other according to the value of the phase in the processing order.

Incidentally, in the phases 15, 31, 47 and 63 of the processing order during the one cycle, the value of the data selection signal SD in the right column is null. This means values of the data selection signal SD for the missing sampling positions should be made invalid by some means. Therefore, any value could be used but here null is used for convenience.

These data are in fact stored in the status shown in FIG. 7 within the interpolation data selection signal memory 16. In this figure, within the data table where reference is made by the base address ADRS (vertical column) and the step number (horizontal line), the left figure represents the data selection signal SD, and the right figure denotes the data (referred to as the processing timing signal TD) for writing clock signal control, which is described later.

If the processing timing signal TD is "1", the writable (write enable) status is made effective. If the signal is "0", the write inhibit status is made effective. Accordingly, the data "00" in the figure denotes an invalid data.

Figure 9:
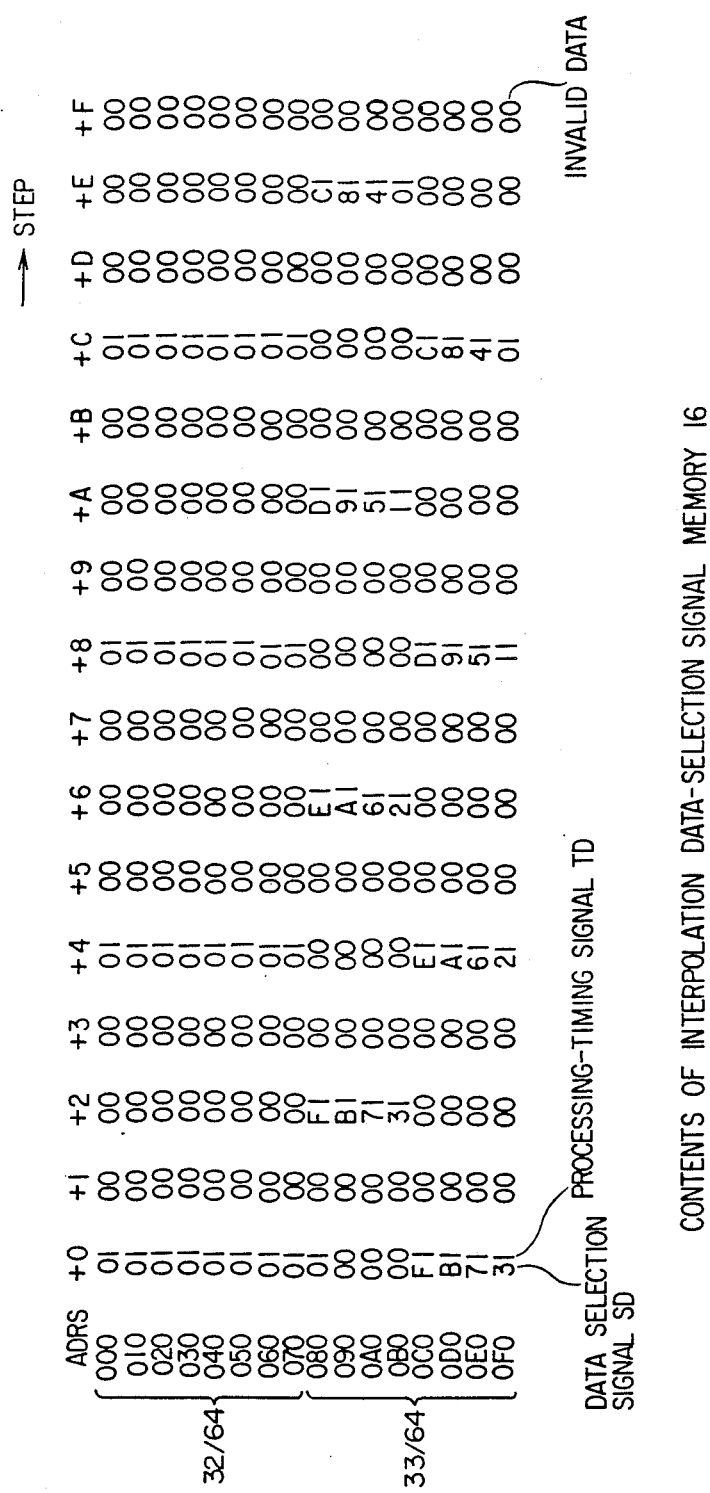
FIG. 9 is a data table illustrating contents of a data selection signal and a processing-timing signal corresponding to FIG. 8.

FIG. 8 illustrates a portion of the data table of the data selection signal SD used in the reducing operation. The exemplified data is attained based on the reducing ratio 33/64. In the figure, the symbol * denotes missing data. The value of the data selection signal SD corresponding to the symbol is null, in this case too, for just the same reason as mentioned in the case of FIG. 6. The data of data selection signal SD, in this case too, is stored in the memory as shown in FIG. 9.

Now, the scale ratio signal selected with the operation key 71 is provided as an address data fed into the interpolation data selection signal memory 16 through the left 7-bit address terminals A7∼A13. The scale ratio signal is, as mentioned above, supplied from the main control circuit 70. At the same time, the counter output from the counter circuit 15 acts as an address data (step number) fed into the right 7-bit address terminals A0∼A6. Accordingly, the synchronizing clock signal CLK2 is supplied into the counter circuit 15.

In this example according to the invention, since the reducing/enlarging operation can be carried out every 1/64 increment from the scale ratio 0.5 (32/64) to 2.0 (128/64), 97 kinds of scale ratio codes may be set as the scale ratio address signal.

Further, since the expected maximum enlarging scale ratio is 2.0, the step number proceeding during the one cycle of the interpolating pattern are composed of 128 steps.

Accordingly, 128 kinds of step number codes may be set as the step number address signal.

Taking the scale ratio 124/64 as an enlarging example in FIG. 7, when step number is in its initial step (0), the address 2D00 can be addressed, thereby the data 01 is outputted as the data selection signal SD and the processing-timing signal TD, and then the step number proceeds to next step being synchronized with CLK2.

When the step number reaches its 128th step, the address data 2D7F can be addressed, thereby the data F1 is outputted as SD and TD.

In this manner, the interpolation data selection memory 16 outputs together with the interpolation data selection signal SD the processing timing signal TD.

The processing timing signal TD is designated "1" when the new image data exists, as mentioned above, and is designated "0" when the new image data does not exist.

The data selection signal SD as well as the processing timing signal TD are latched at the latch circuit 17. The synchronizing clock signal CLK2 controls the latch timing.

The processing timing signal TD is for controlling the timing of the interpolation data S which is to be latched up at the latch circuit 14. For this reason, the processing timing signal TD is supplied via the latch circuit 17, and is allowed to delay by an access time of the interpolation memory 13.

The processing timing signal TD as delayed by a specific duration (one cycle of the synchronizing clock signal CLK2) is transferred as a gate signal to the gate circuit 19. The synchronizing clock signal CLK2 is supplied to the gate circuit 19 which is controlled so as to open when the processing timing signal TD is at "1" and to close when the signal is at "0". The clock signal is outputted only when the gate is opened.

The synchronizing clock signal CLK2 outputted from the gate circuit 19 is used as a latch pulse for the latch circuit 14, so as to latch up only valid data out of the interpolation data S outputted from the interpolation memory 13. The synchronizing clock signal CLK2 outputted from the gate circuit 19 is also employed as a writing clock signal for the output buffer circuit 90 in a following stage, so that only the valid data outputted from the latch circuit 14 is outputted as new image data.

The discussion, above, is for the principal constitution of the image processing circuit 2. Now, the output data generated at the image processing circuit 2 is, after being binary coded, transferred to the output device 65 or image memory 64 through the output buffer circuit 90 (its details are given later).

One example of a circuit constitution for binary coding is described by referring to FIG. 3 again.

In this figure, a threshold value table 69 contains a main scanning counter 20 to count the writing clock signal from the gate circuit 19, a sub scanning counter 21 to count the horizontal direction synchronizing signal and a dither matrix 22 to output the dither threshold value based on the counts of the counters 20 and 21.

Then, a binary coding circuit 23 (the image data outputted from the latch circuit 14) pixel by pixel by comparing then with the dither threshold value from the dither matrix 22.

Figure 10:
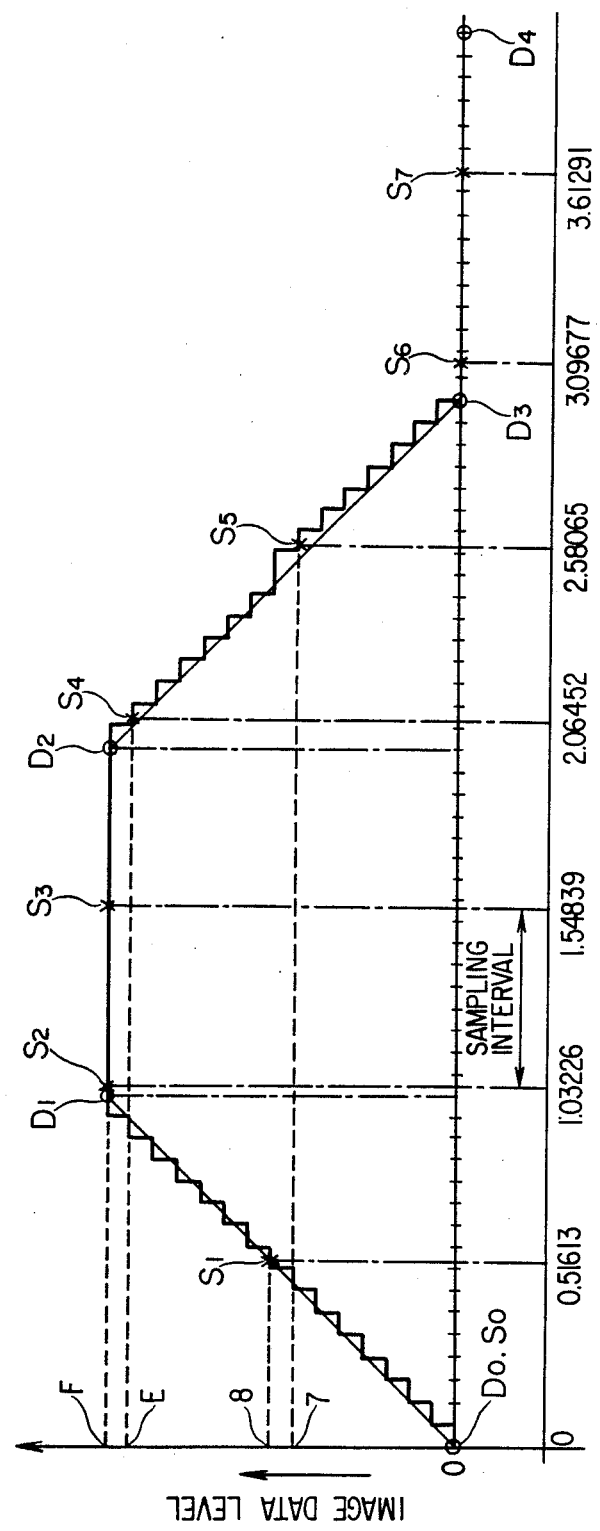
FIG. 10 is a signal waveform diagram used for the description of the image enlarging functions.

Next, the image processing operation by the above-mentioned image processing device 2 is described in detail, starting with the enlarging operation by referring to FIG. 10 and those following it. For the sake of convenience, the enlarging ratio M is designated as 124/64 (=1.94).

FIG. 10 is an analogous illustration of the correlation between the original data and the post-interpolation data, where D denotes the original data, and S the post-interpolation output data.

The correlation between the image data level and the post-interpolation data is the same as in FIG. 4. Additionally, the interrelation between the sampling pitch and the data selection signal SD, in this interpolation, is identical with the example in FIG. 6.

Figure 11:
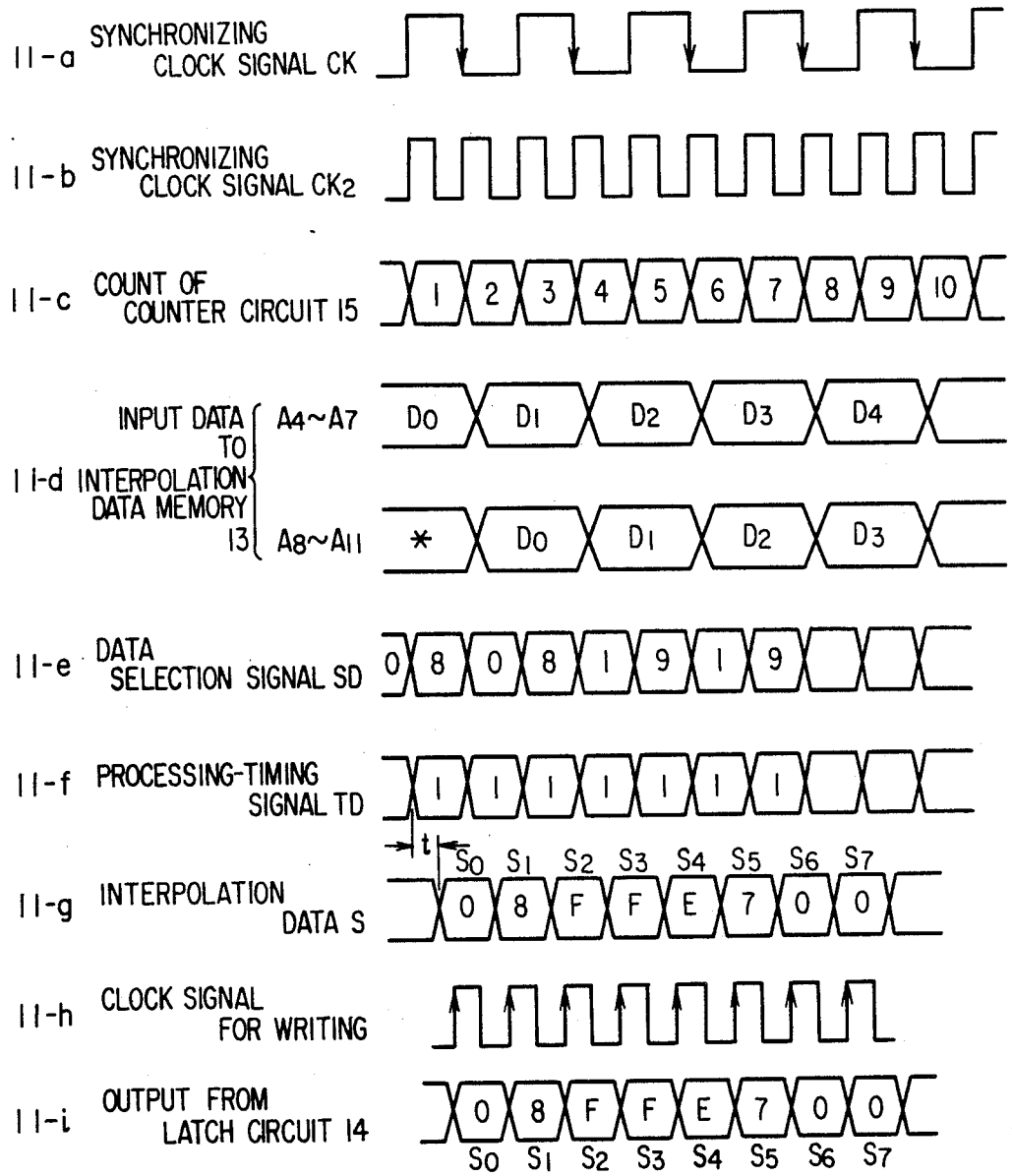
FIG. 11 is a timing chart for similar processing.

The chart for signal timing at each point, during this interpolation, is as shown in FIG. 11.

Accordingly, it is assumed that the original image data currently obtainable from the CCD 60 are D0(0), D1(F), D2(F), D3(0) and D4(0), where each numeral in parentheses () denotes the tone level in each image data. Being synchronous with synchronizing clock signal, the latch circuit 11 outputs D1(F), and the latch circuit 12 outputs D0(0).

On the other hand, the data table shown in FIG. 7 is referred to based on the externally designated scale ratio signal as well as the output of counter circuit 15. As the data selection signal SD, the following are outputted: 0, 8; 0, 8; 1, 9; 1, 9; ... (11-e in FIG. 11). As the processing timing signal TD, the following are outputted: 1, 1, 1, ... (see 11-f in the same figure).

The interpolation memory 13 outputs the necessary interpolation data S (11-g in the same figure), by referring to the interpolation data table based on the image data D0 and D1, and the data selection signal SD.

It is appreciated from FIG. 4-b, as the data selection signal SD is set at 0, then 8, for the image data D0(0) and D1(F), 0 is outputted as the interpolation data S0, and 8 is outputted as the data S1.

As the data selection signal SD is set at 0, then 8, for the image data D1(F) and D2(F), F is outputted as the interpolation data S2, and then F is also outputted as the data S3. As the data selection signal SD is set at 1, then 9, for the image data D2(F) and D3(0), E is outputted as the interpolation data S4, and then 7 is outputted as the data S5. As the selection data SD is set at 1, then 9, for the image data D3(0) and D4(0), 0 is outputted as the interpolation data S6, and then 0 is outputted as the data S7.

Likewise, the similar data reading of the interpolation data S is further carried out for the following image data D5, D6, ....

Accordingly, the post interpolation data designated with symbol x produce the diagram in FIG. 10. This demonstrates that the image data having specific level have been inserted between the original image data and outputted.

In this way, based on actual image data D0~D4, the interpolation data S0~S7 are sequentially read out, and these interpolation data are sequentially transferred to the latch circuit 14 (11-i in the figure).

On the other hand, the processing timing signal TD outputted from the latch circuit 17 is delayed by the period of synchronizing clock CLK2 (see FIG. 11-f and 11-g) in the latch circuit 18. This delaying period is, as mentioned above, for assuring the necessary time span (see 11-f and 11-g in FIG. 11) for data access in the interpolation data memory 13.

As the processing timing signal TD from the latch circuit 18 controls the turning on or off of the gate circuit 19, the latch circuit 14 executes latching only when the gate circuit 19 is on, otherwise the circuit does not latch.

Now, the reducing operation is described as follows.

Figure 12:
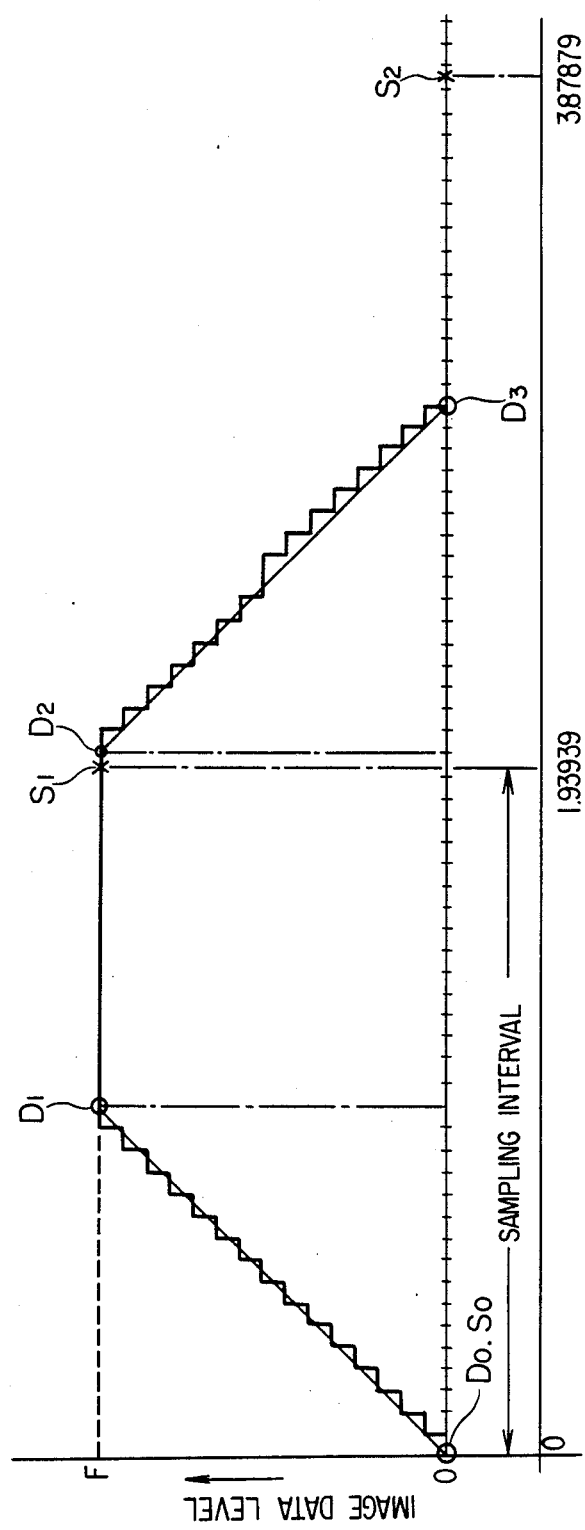
FIG. 12 is a signal waveform diagram used for the description of the image reducing functions.
Figure 13:
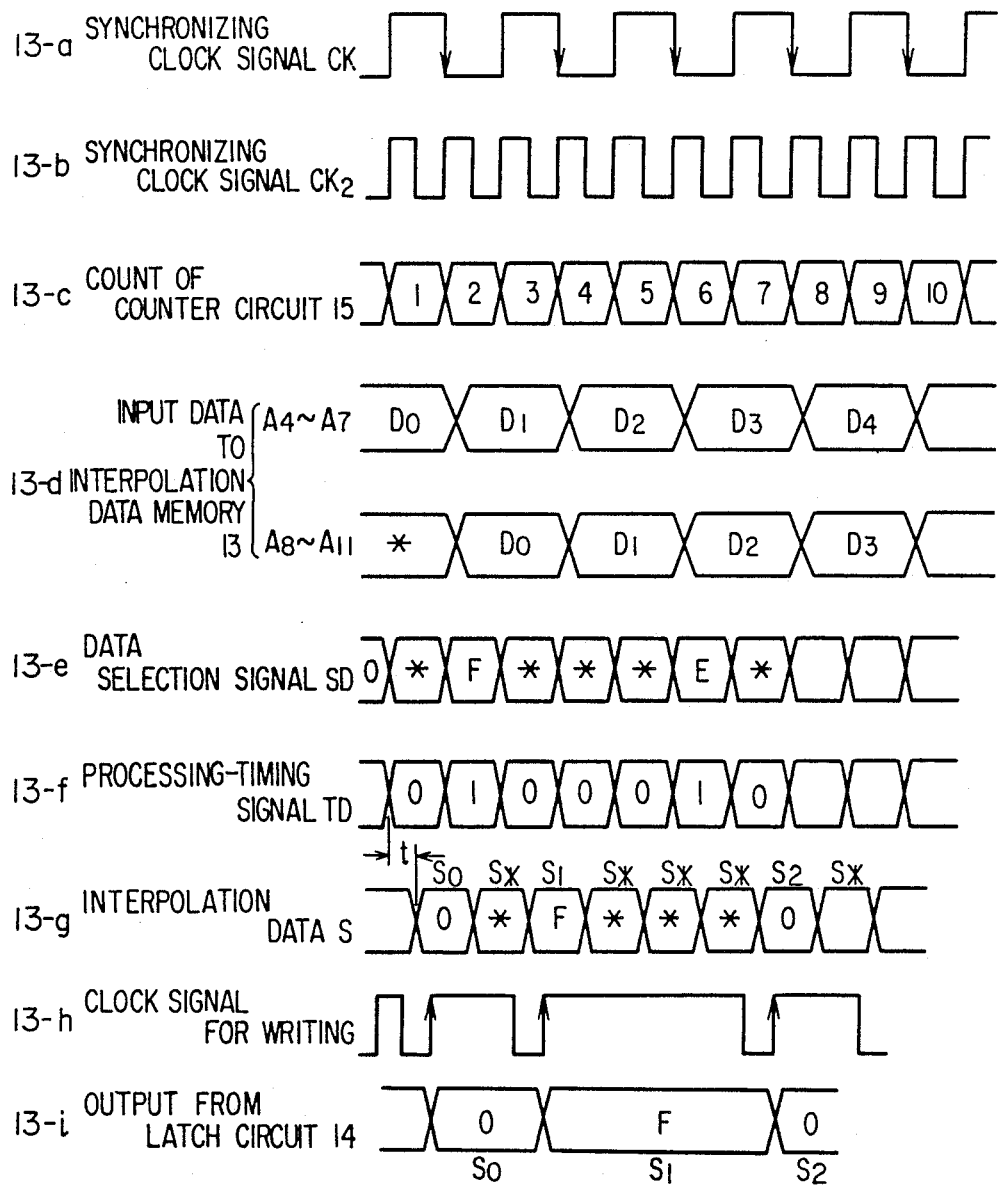
FIG. 13 is a timing chart for the similar processing.

FIG. 12 is an analogous illustration of the image data in the reducing operation, where symbol o marks the image data D0, D1, D2, D3, ..., and symbol x marks the interpolation data S0, S1, .... FIG. 13 illustrates the timing chart of signals in such an operation. In relation to such an operation, the interrelation between the original image data D employed and the interpolation data S is identical with that illustrated in FIG. 4. The interrelation between the similar image data D and the data selection signal SD is identical with that illustrated in FIG. 8.

Additionally, the reducing ratio M stated here is 33/64 (=0.52). Also, the tone levels of the image data are the same as those in the above-mentioned enlarging operation.

Two neighboring image data (for example, the image data D1 and D0) are fed as address data from the latch circuits 11 and 12 into the interpolation data memory 13, and the externally selected reducing ratio (33/64) is outputted into the interpolation data selection signal memory 16, and the synchronizing clock signal CLK2 is counted with the counter circuit 15. This operation is identical with the above-mentioned enlarging operation.

As can be understood from FIGS. 8 and 9, the selection memory 16 outputs the following data selection signal SD: 0, *; F, *;, *, *; E, 0; . . . . As the processing timing signal TD, the following are outputted: 1, 0, 1, 0, 0, 0, 1, . . . . However, as the symbol * denotes invalid data, 0 is instead stored in the interpolation data selection signal memory 16.

Correspondingly, the interpolation data S shown in FIG. 13 is read out from the interpolation data memory 13.

More specifically, as the data selection signal SD for the image data D0(0) and D1(F) gives 0 and 0*, both are outputted as the interpolation data S0 and S*.

As the data selection signal SD for the image data D1(F) and D2(F) gives an F and F and F are outputted as the interpolation data S1 and S*. As the data selection signal SD for the image data D2(F) and D3(0) gives 0 and 0, F and F are outputted as the interpolation data S* and S*. As the data selection signal SD for the image data D3(0) and D4(0) gives an E and 0, 0 and 0 are outputted as the interpolation data S2 and S*.

Afterwards, the reading of the interpolation is, similarly to the above-mentioned, executed on the image data D4, D5, . . . .

As mentioned above, because the data are read out on the actual image data D0, D1, . . . with the interpolation, the interpolation data S0, S*, S1, S*, . . . are sequentially read out, and transferred to the latch circuit 14.

At the same time, the processing timing signal TD gives 1, 0, 1, 0, 0, 0, 1 . . . (13-b in FIG. 13), and, accordingly, the write clock signal outputted from the gate circuit 19 appears as shown by 13-h in FIG. 13, and the invalid data S*'s are thinned out and the interpolation data S0, S1, S2, . . . are outputted. (13-i in FIG. 13)

In the case of the above-mentioned example, it is apparent that the modification of enlarging or reducing ratio varies the data selection signal SD outputted from the interpolation data selection signal memory 16, and the interpolation data memory is accordingly addressed to output the corresponding interpolation data S.

Now, the image data with enlarging or reducing process incorporated and binary coded are fed into the output buffer circuit 90. The output buffer circuit 90 controls, according to the enlarging or reducing ratio, data write timing as well as write address on the line memory provided within the output buffer circuit 90 itself. The following examples illustrate the cases where write timing and write address are controlled.

Figure 14:
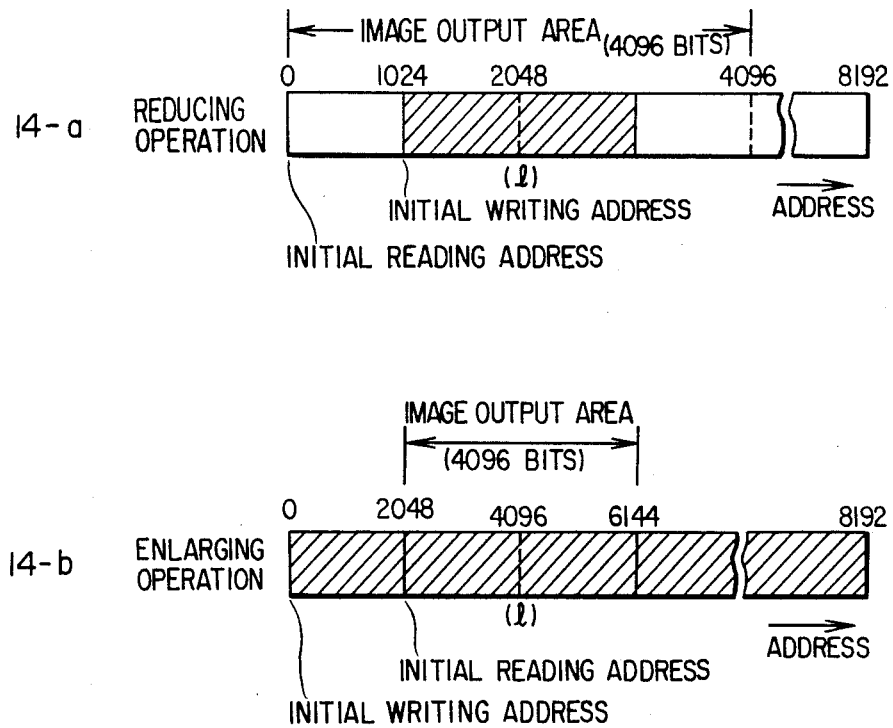
FIG. 14 is a diagram employed to describe line memories.
Figure 15:
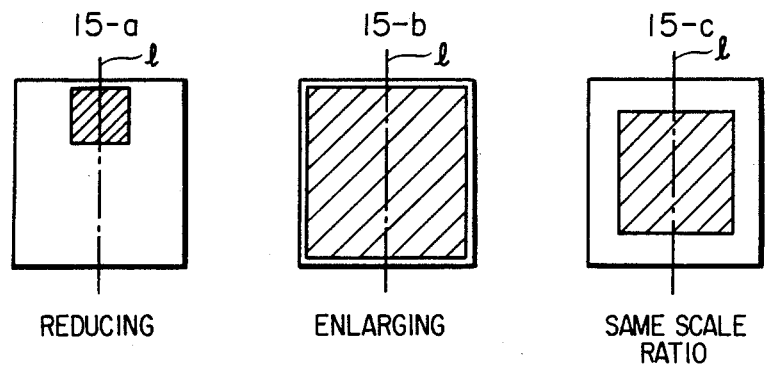
FIG. 15 is a schematic diagram of recorded images.

The reason to control the writing timing and write address according to the scale ratio is described by referring to FIGS. 14 and 15.

When assuming that the maximum image size to be read by the CCD 60 is B4, and if the resolution of the CCD 60 is 16 dots/mm, the amount of image data per line is 4096 bits. In consideration of the scale ratio up to two, the line memory having 8192 bit capacity, as is shown in FIG. 14, is provided for storing the image data.

Then, the image data is written or read so that the recorded results may be based on the center.

Accordingly, in the reducing operation, for example, the ½ reduction of the image, the initial writing address into the line memory is set at the address (1024th address) which is equal to ¼ of 4096 bits. In this case, the reduced image data is written into the line memory in the manner shown by 14-a in FIG. 14.

At the same time, the initial reading address is set at address 0. Correspondingly, the reduced image shown by 15-a in FIG. 15 is recorded.

This is because that the image data are "0s" between the two addresses, 0 and 1023, and the space between the addresses is recorded on a recording paper as blank, and that the recording based on reduced image data only begins at address 1024.

For example, in the case of the reducing ratio 32/64, writing of the reducing image data starts at address 1024. Similarly, in the case of reducing ratio 33/64, the writing starts at address 992. If the reducing ratio is 34/64, the writing starts at address 960.

In this way, an image is recorded based on the center line 1 of the recording paper 53, by writing the image data so that the writing result is adjusted to the center and by starting the reading at address 0.

Correspondingly, the initial writing address of the reducing operation is determined as shown below.

$$\text{Initial writing address} = (4096 - 4096 \times \text{reducing ratio})/2$$

In the case of the enlarging operation, contrary to the reducing operation, the initial reading address is controlled because of the increased image data.

If the maximum enlarging ratio is two, then the image data is twice as many as the equal ratio operation.

This means the four-fold area of the image to be recorded. Naturally, it is impossible to enlarge, for example, a B4 sized draft two times and record the whole enlarged image on a recording paper if its size is B4.

In view of this, it is convenient in obtaining a proportionally enlarged image to limit in advance the image data to be written in accordance with the maximum size of the recording paper.

Therefore, as shown by 14-b in FIG. 14, in the enlarging operation, the only 4096 bits, or 2048 bits before and 2048 bits after the intermediate point (corresponds with the location of the center line 1 of the image to be enlarged) of the total amount of enlarging image data are read out.

Accordingly, in the case of the enlarging ratio 128/64, the data in the initial bit through the 2047th bit, among the enlarged image data, are ignored, and the reading from the line memory starts at the data in 2048th bit. This means the image data of 4096 bits are read out.

At the same time, the writing address signal is set at "0".

Likewise, in the case of the enlarging ratio 127/64, the reading starts at the 2016th bit. In the case of the enlarging ratio 124/64, the reading starts at the 1984th bit, and the total of 4096 bit image data are to be read out.

If the other enlarging ratio is designated, too, it is the matter of course that the image data is designated so that the reading may start at the initial reading address in accordance with the ratio.

To sum up, the initial reading address for enlarging operation is determined by the following formula.

$$\text{Initial reading address} = (4096 \times \text{enlarging ratio} - 4096)/2$$

Incidentally, if the data is read from the line memory, starting at the midway of the enlarging image data, as mentioned above, the probability of missing image due to the enlargement of the unnecessary zone is greatly reduced, because the image data based on the central zone of the original image is recorded.

Consequently, the initial address for reading or writing in enlarging or reducing operation is determined as shown in FIG. 16.

Figure 17:
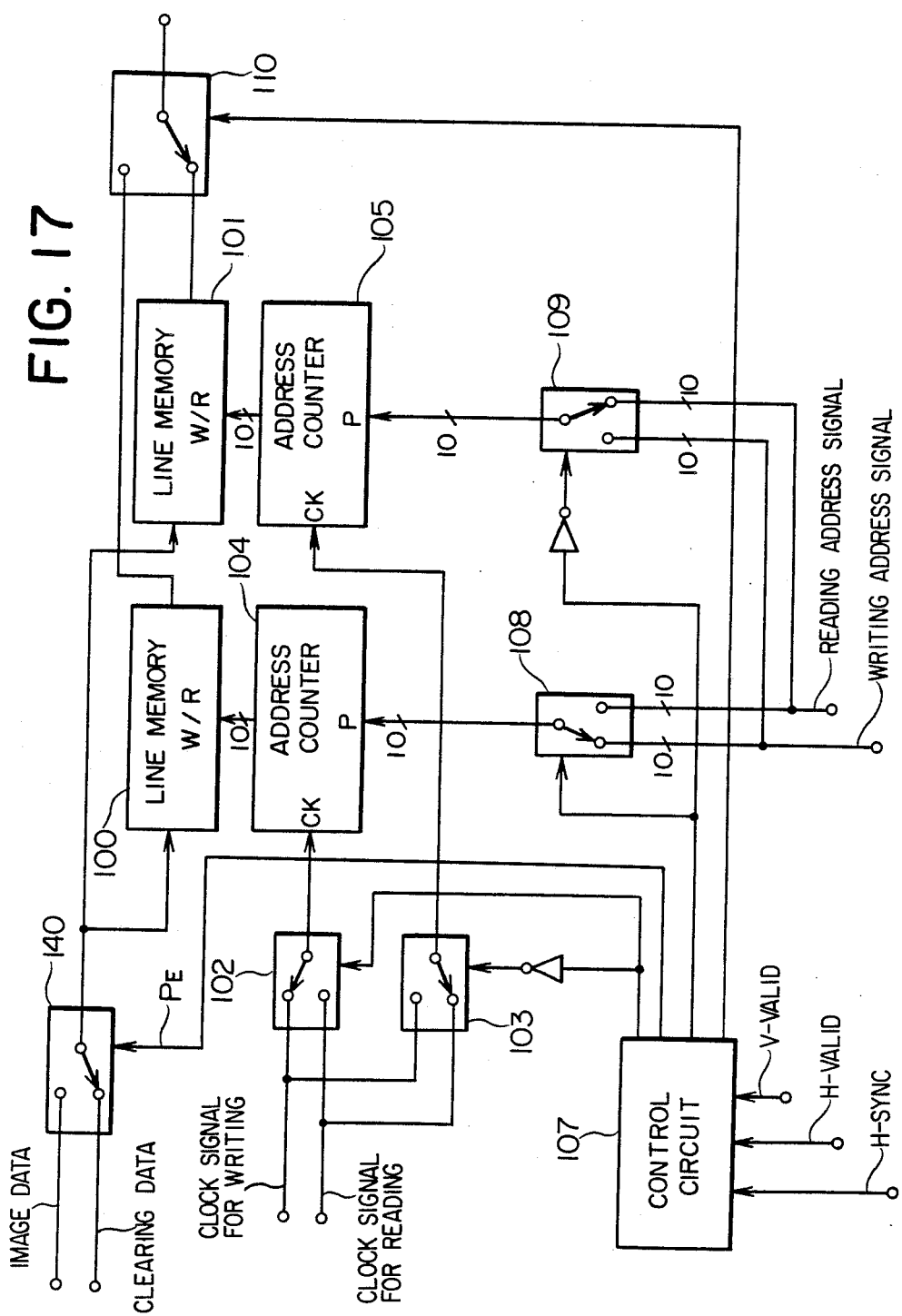
FIG. 17 is a block diagram illustrating one example of an output buffer circuit.

FIG. 17 gives a circuit diagram for one example to enable the above-mentioned functions.

FIG. 17 illustrates one example of an output buffer circuit 90. A pair of line memories 100 and 101 are provided in the output buffer circuit 90, and image data for one line is fed into each of the line memories. This pair of line memories are so provided as to carry out the reading or writing process of the image data on the real-time basis, by feeding one line of image data alternately to each of them. For each of the line memories 100 and 101, a memory having 8192 bit capacity is, as mentioned previously, utilized.

The writing or reading process for the line memories 100 and 101 is controlled in the following manner.

For writing the data into one or the other of the line memories, the write clock signal (the clock signal generated at the image processing circuit 2) available from the timing signal generating circuit 10 is employed. For reading the data from one or the other of the line memories, the clock signal for the output device 65 is employed. These these clock signals are respectively transmitted via the first and second switches 102 and 103 for selecting proper one to each of address counters 104 and 105.

Both of the first and second switches 102 and 103 are complementarily controlled with each other so that one line memory is in the reading mode when the other line memory is in the writing mode. To enable this, the switches are controlled with the control signal for horizontal synchronization (18-c in FIG. 18) outputted from a control circuit 107.

Additionally, each of the address signals to determine either the initial writing address or initial reading address for each of the line memories 100 and 101 is fed into each of the address counters 104 and 105 via each of the third and fourth switches 108 and 109. Both of the third and fourth switches 108 and 109 are also complementarily controlled with each other so that one address counter is in the reading mode when the other address counter is in the writing mode. The control signal for horizontal synchronization as shown by 18-c in FIG. 18 is also fed into these switches 108 and 109.

Figure 18:
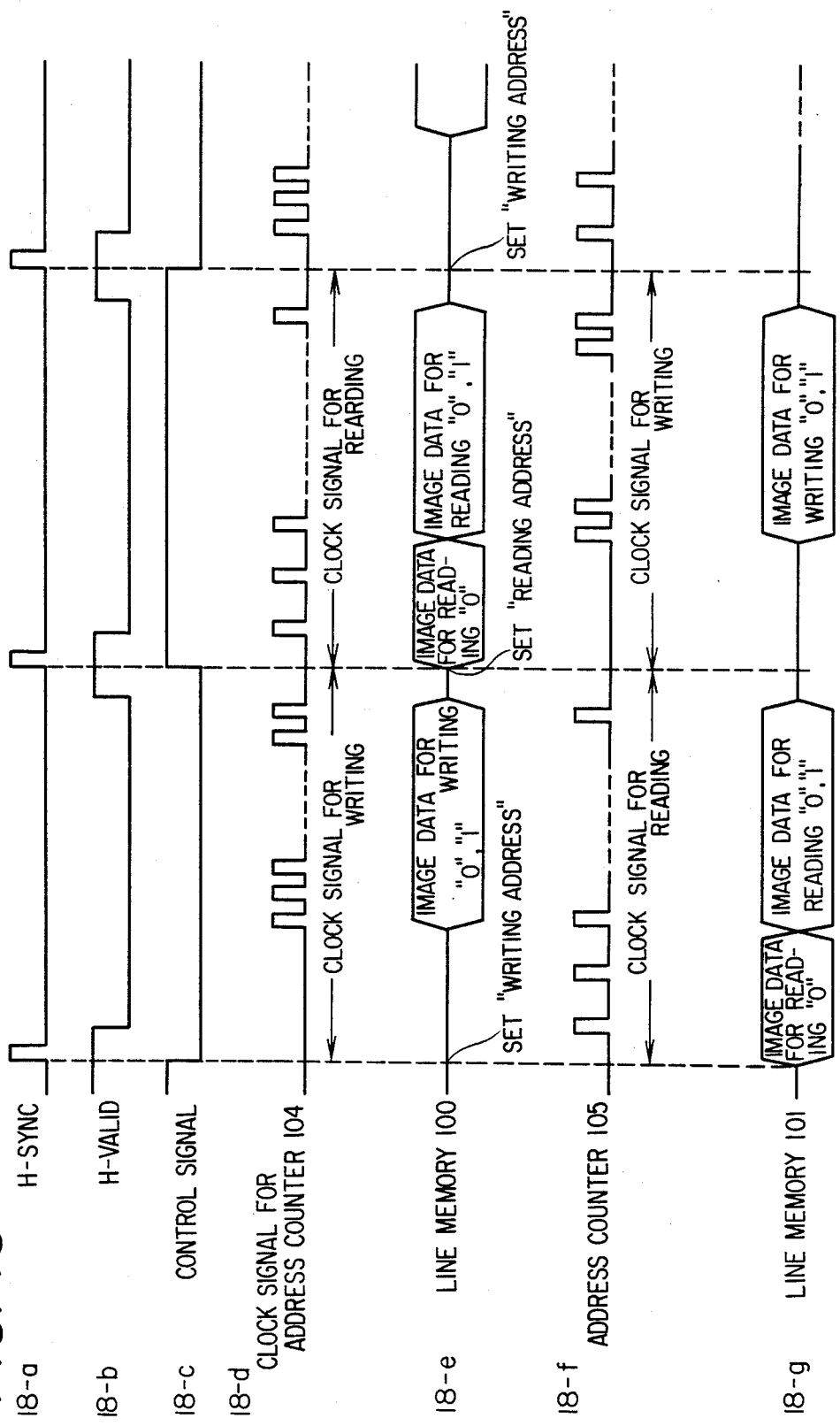
FIG. 18 is a signal waveform diagram used to describe the operation of the similar circuit.

The initial writing address or initial reading address is preset, at the address counter 104 or 105, in synchronization with the horizontal synchronizing signal (1-a in FIG. 18).

One or the other of the outputs from the line memories 100 and 101 is selected at the fifth switch 110, then fed into the previously mentioned output device 65 or the image memory 64. As the fifth switch 110 is for selecting the line memory in the reading mode, a control signal having a phase reverse to the control signal shown by 18-c in FIG. 18 is employed.

Data supply lines to the pair of the line memories 100 and 101 are provided with the sixth switch 140, where clearing data as well as the image data transferred from the image processing circuit 2 are selectively supplied.

The clearing data is utilized in order to clear the data stored within the pair of line memories 100 and 101 before the image data is supplied thereto. Such an arrangement is provided because data (invalid image data) different from the appropriate image data may remain within the line memories 100 and 101 if these line memories are not cleared after the power source is turned on or the scale ratio is modified.

As clearing data, data "0" or "1" may be employed. Because a binary code is used for image data, this example employs "0" as clearing data. Such clearing data may be generated at the main control circuit 70.

The sixth switch 140 is controlled with the clearing signal PE generated at the control circuit 107.

Figure 19:
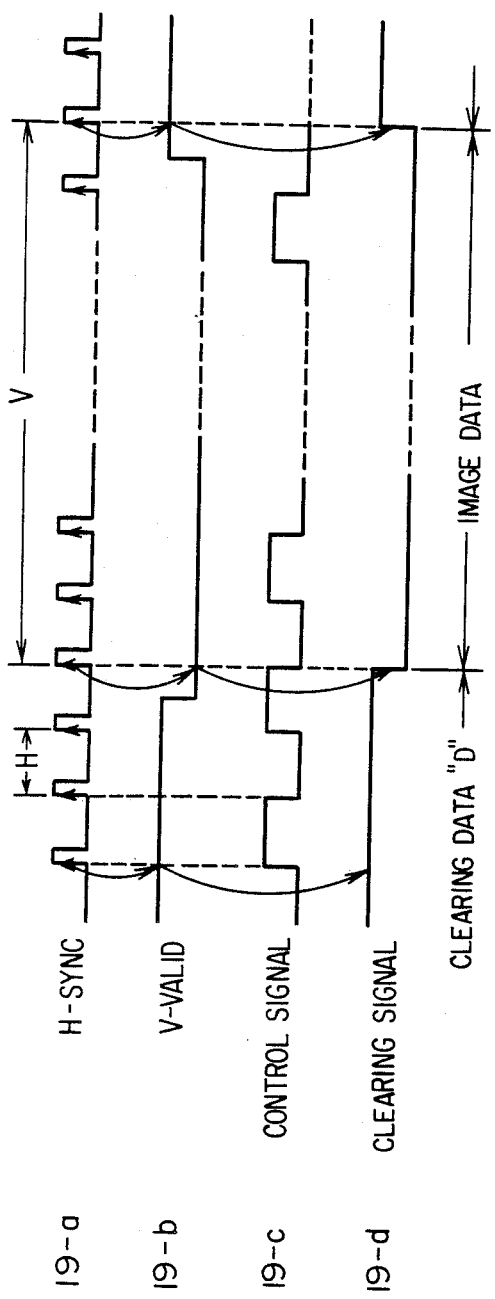
FIG. 19 is a signal waveform diagram used to describe the clearing function.

The clearing timing for the line memories 100 and 101 is set during the period when the zone other than the valid one is being read in the image reader. In this example, the reading period on the vertical invalid zone is utilized for this purpose. Correspondingly, a signal shown by 19-d in FIG. 19 is used as the clearing signal PE, by latching the vertical direction valid signal (V-VALID) with the horizontal synchronizing signal (H-SYNC) as shown by 19-a and 19-b in FIG. 19.

By switching the sixth switch 140 to the clearing data side only for the period where the clearing signal PE is at "1", the control signal (19-c in FIG. 19) supplied during this period allows the clearing data "0" to be written into all the addresses in the line memories 100 and 101.

Consequently, even if any data have been written in the line memories 100 and 101 at the moment when the power source is turned on, all of such data are cleared utilizing the vertical direction valid signal and the horizontal synchronizing signal, thereby completely erasing the invalid image data.

Additionally, if the clearing signal PE is made available for the period at least two horizontal scannings are conducted, the data stored within a pair of line memories 100 and 101 can be completely deleted.

Figure 20:
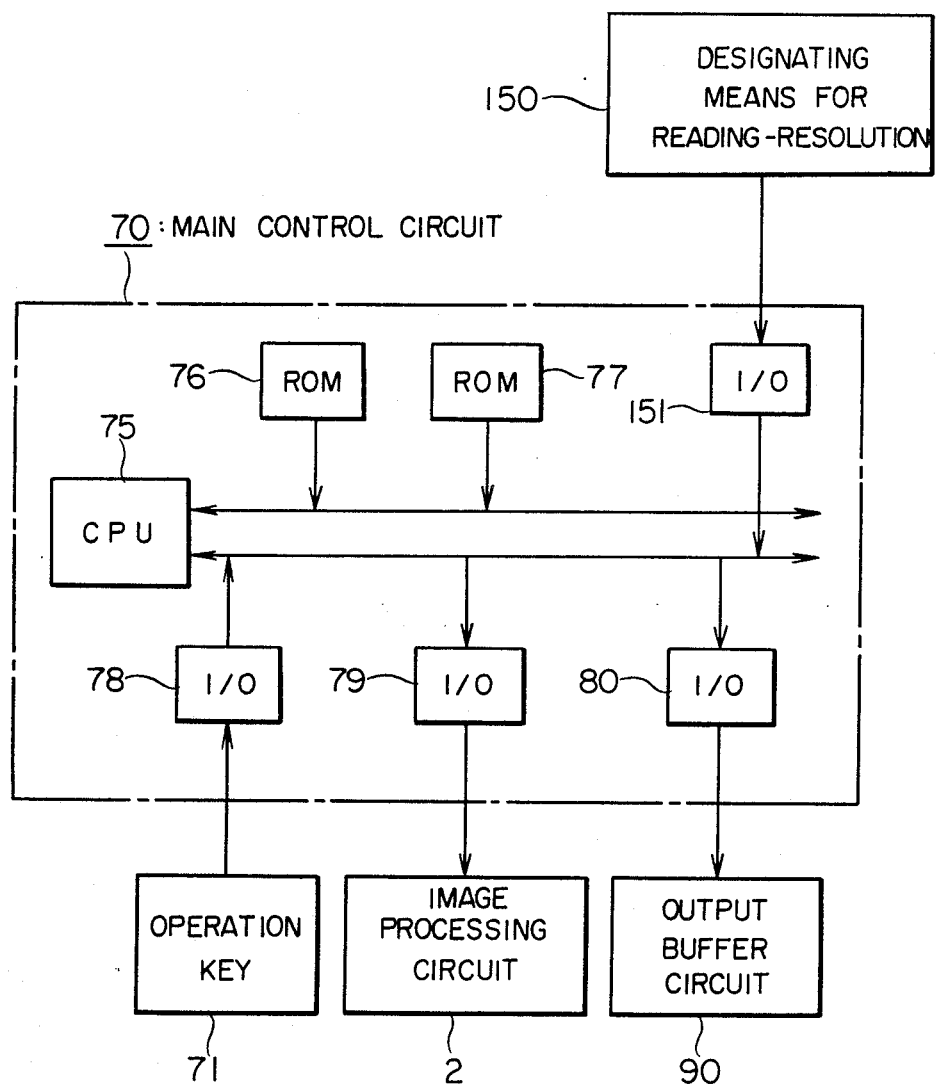
FIG. 20 is a block diagram illustrating one example of a main control circuit.

Incidentally, the above-mentioned initial writing/reading addresses (data) are generated at the main control circuit 70 shown in FIG. 20.

In FIG. 20, numeral 75 represents a CPU. Numeral 76 represents a ROM storing a control program. Numeral 77 denotes a ROM storing the writing/reading address data shown in FIG. 16.

The scale ratio determined with the operation key 71 is fed into the CPU 75 via an I/O port 78. Correspondingly, the initial writing/reading addresses data in compliance with the scale ratio are fed into the above-mentioned third or fourth switch 108 or 109 via an I/O port 79.

The main control circuit 70 is provided with the designating means 150 for reading-resolution. In this example, three stages of reading resolution can be designated with the means in order to cope with different recording-resolutions of various recorder.

For example, if the first reading-resolution is 16 dots/mm, 12 dots/mm and 8 dots/mm are respectively designated for the second and third reading resolutions.

Such designation of the reading-resolution is effected by switching dip switches (not shown in the Figures) provided on the image processing device.

The reading-resolution (digital data) obtainable from the designating means 150 for reading-resolution is fed into the CPU 75 via the I/O port 151. The CPU 75 determines the scale ratio necessary to correctly record an image in the selected ratio through arithmetic operation or by referring to the data table, based on the reading-solution, above, as well as the externally determined scale ratio signal. FIG. 20 shows the case where the new scale ratio, that is, an adjusted scale ratio signal, is generated utilizing the data table. One example of such a data table is shown in FIG. 21.

As mentioned above, if the reading-resolution of the CCD is 16 dots/mm, and if the recording-resolution of the recorder is the same as the reading-resolution, the rectified scale ratio signal equals the designated scale ratio.

However, if the recording-resolution is 8 dots/mm, this recording-resolution is transmitted to the main control circuit 70 as the designated reading-resolution. In this case, the reading-resolution is set twice as large as the recording-resolution, accordingly, if the selected scale ratio is set, for example, at twofold, the scale ratio 1.0 (64/64) is determined as the adjusted scale ratio.

The image processing circuit 2 executes enlarging or reducing operation based on the adjusted scale ratio signal. Correspondingly, in the above-mentioned example, the data processing operation is executed by regarding the selected scale ratio as the equal ratio. However, as the recording-resolution of the recorder is ½, the image is recorded twice as large as the original image even with the equal ratio image data.

Accordingly, in the case where the reading resolution of CCD is 16 dots/mm and various reading resolutions such as 16, 12 and 8 dots/mm are adopted, the correlation between a selected scale ratio and an adjusted scale ratio signal appears as shown in FIG. 21.

Additionally, as the reducing scale ratio 0.5 corresponding to the recording-resolution 16 dots/mm becomes the scale ratio of ¼ in the case of the recording-resolution being 8 dots/mm, accordingly, the adjust scale ratio is 16/64.

In this way, even if a recorder having a recording-resolution different from a reading-resolution is employed, the image can be recorded in the size corresponding with the externally selected scale ratio by using an adjusted scale ratio signal.

Likewise, even if a reading resolution will be differently changed from the recording resolution, on the contrary to the above, the image can be recorded in the same manner by using an adjusted scale ratio signal.

Figure 22:
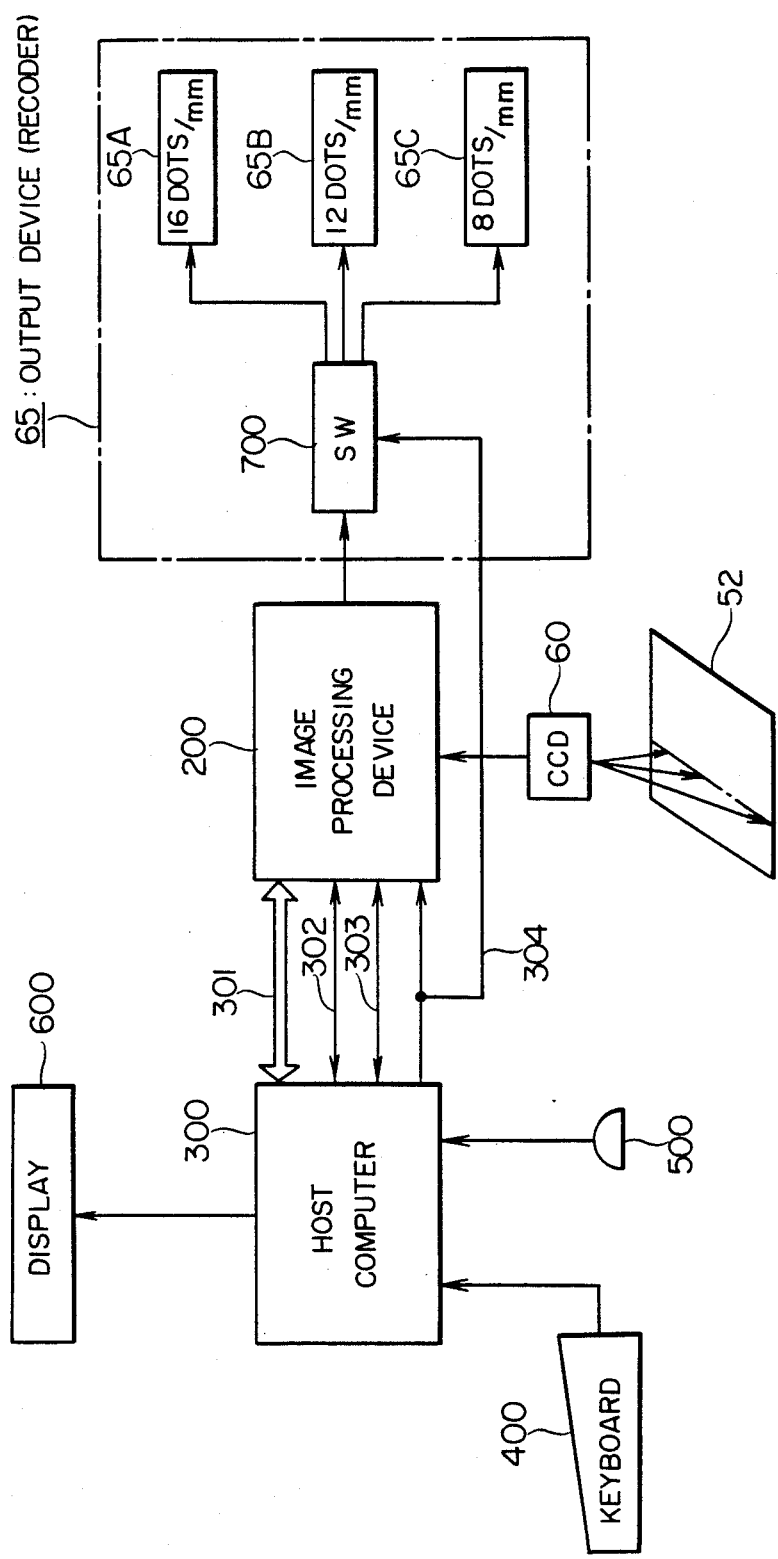
FIG. 22 is a schematic diagram showing one example of an image processing system involving a host computer.

FIG. 22 illustrates one example of an image processing system having a host computer incorporated.

Image information of an original draft 52 is read out with a CCD 60 serving as a means for reading, and the image signal (analog) is fed into an image processing device 200, where various image processing operations are carried out. The processed image data is transferred via a switch 700 to a plurality of recorders 65A~65C provided on an output device 65, where a required image is recorded.

A host computer 300 is connected to the image processing device 200, and sends various image processing instructions to the image processing device 200. To achieve this, a plurality of data buses connect the image processing device 200 with the host computer 300.

A bus 301 is a data bus to transfer the image data and control command. A bus 302 is a control bus to control the transfer timing of the image data. A bus 303 is a control bus to further control the control command, above. A bus 304 is a control bus (selection bus) to designate one of the recorders 65.

The host computer 300 is controlled by the control signal entered with a keyboard 400.

Numeral 600 denotes a display used to display the data inputted into the host computer or a job menu or the like. A mouse 500 is employed to enter a coordinate necessary for arranging a layout of an image presented on the display 600 or to designate a job on the job menu.

Additionally, the image processing operation based on the instruction from the host computer is detailed later.

The general constitution of the image processing device appropriate for the incorporation into the above-mentioned image processing system is essentially the same as in FIG. 1-b which was previously described in detail. The difference with this system is that the scale ratio signal as well as reading resolution designation data are determined with the keyboard 400. These signal and data are transferred to the main control circuit 70 via the host computer 300. The reading resolution designation data is also used as the designation signal for designating the recorder 65. Further, an image memory 64 is contained in the host computer 300.

With the main control circuit 70 in FIG. 20, the scale ratio data selected with the keyboard 400 instead of the operation key 71 is transmitted from the host computer 300 to the CPU 75 via the I/O port 78. Accordingly, the initial writing address data in compliance with the ratio is fed into the third or fourth switch 108 or 109 shown in FIG. 17 via the I/O port 79.

As mentioned above, the reading resolution designation data is supplied to the main control circuit 70. As shown in FIG. 22, with this example, an arrangement is provided so that one of the three recorders 65A~65C respectively having a different recording-resolution may be designated from the host computer 300 side.

It is assumed that the recording-resolution of the first recorder 65A is 16 dots/mm, and the recording resolutions of the second and third recorders 65B and 65C are respectively 12 dots/mm and 8 dots/mm.

A reading-resolution in compliance with one of these recording-resolutions is designated with a command signal from the host computer 300.

The reading-resolution (digital data) determined with the keyboard instead of the designation means 150 for reading-resolution shown in FIG. 20 is inputted into the CPU 75 via the I/O port 151. The CPU 75 determines the new scale ratio required for correctly recording an image in the selected scale ratio, through arithmetic operation or by referring to the data table, based on the reading-resolution, mentioned above, as well as the scale ratio signal also designated with the keyboard 400. The method to determine the new scale ratio, that is, the adjusted scale ratio signal, is the same as the case where the previously mentioned designating means 150 for reading-resolution, and, the data table shown in FIG. 21 is likewise employed.

As mentioned above, if a recorder having a recording-resolution different from a reading-resolution is designated from the host computer 300, an image can be recorded in the externally selected scale ratio by utilizing an adjusted scale ratio signal.

Next, the operation of the image processing system illustrated in FIG. 22 is described in detail with reference to FIGS. 23~25.

(1) The case where a control command is transferred from the host computer 300 to the image processing device 200.

Figure 23:
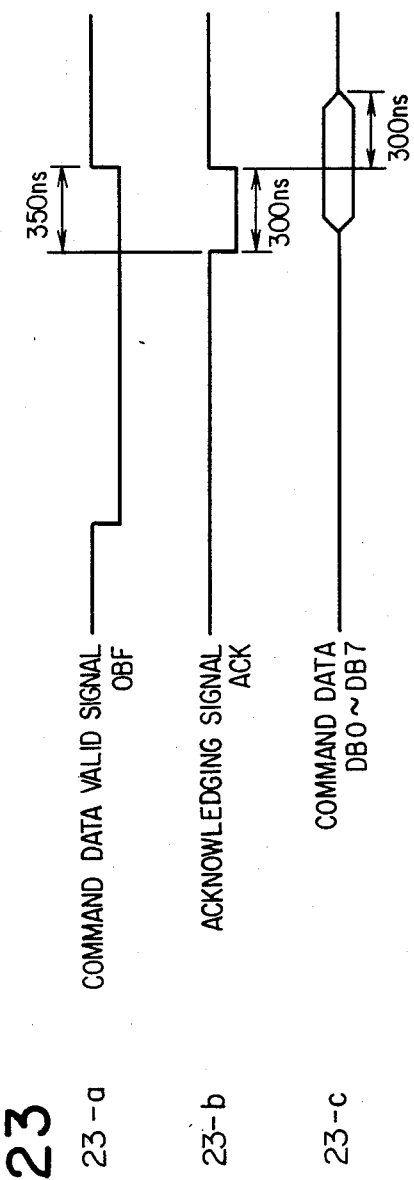
FIGS. 23~25 give signal waveform diagrams used to describe the operations of an image processing system.

The description is provided by referring to the timing chart in FIG. 23. When transferring a control command, the host computer 300 sets a command data valid signal OBF on a command control bus 302 at "L", and feeds 8 bit control command DB0~DB7 to a data bus 301. When detecting the command data invalid signal OBF (23-a in FIG. 23) being at "L", the CPU 75 outputs a negative logic acknowledging signal ACK (23-b in FIG. 23) into the command control bus 302, and simultaneously introduces within itself the control command data DB0~DB7 (23-c in FIG. 23) already established on the data bus 301. The fetched control command data is transferred to the CPU 75. The CPU 75 interprets the transferred control command data and operates in accordance with the command data.

For example, if such a command is for designating a scale ratio, the CPU 75 outputs a scale ratio designation signal to the image processing circuit 2, and simultaneously displays it on a display provided on the host computer 300. In this case, the displayed scale ratio is the same as the ratio preset on the keyboard 400.

(2) The case where a control command is transferred from the image processing device 200 to the host computer 300.

Figure 24:
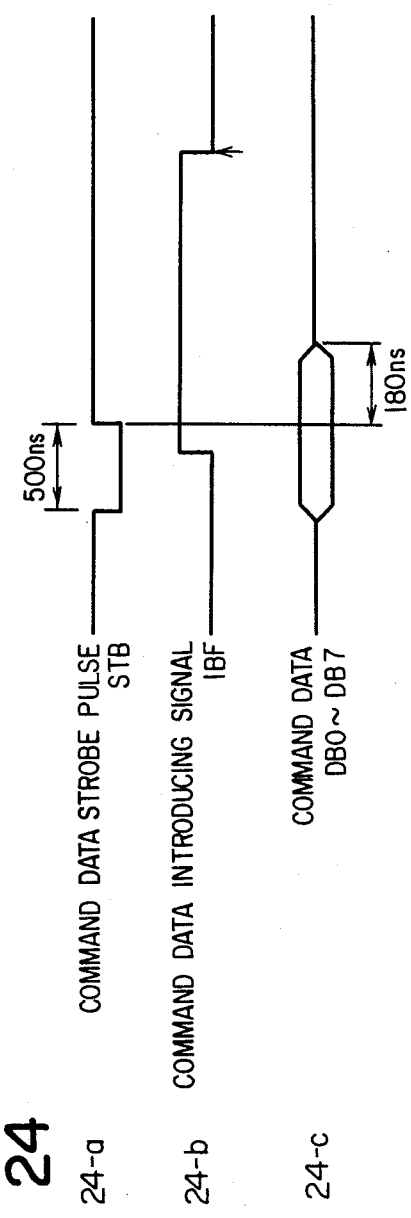

The description is made by referring to the timing chart in FIG. 24. The CPU 75 outputs a command data strobe pulse STB (24-a in FIG. 24) onto the command control bus 302, and, at the same time, outputs in synchronization with the pulse an 8 bit image data or control command DB0~DB7 (C in FIG. 24) onto the data bus 301.

Upon reception of the STB pulse, the host computer 300 latches the control command DB0~DB7 onto an internal latch circuit, (not shown in the figure) and set a command data introducing signal IBF (24-b in FIG. 24) on the command control bus 302 at "H". At this point, as the host computer 300 has not yet read out the introduced command data DB0~DB7, it cannot receive the next data. The host computer 300 sets the IBF signal at "L", in synchronization with the trailing edge of STB pulse, after completing reading of the control command.

After confirming that the IBF signal is at "L", the CPU 75 transfers the next image data or control command.

After completion of such transfer operations for the control command as described in (1) and (2), the reading operation for draft information is commenced.

(3) Reading operation for draft information

Figure 25:
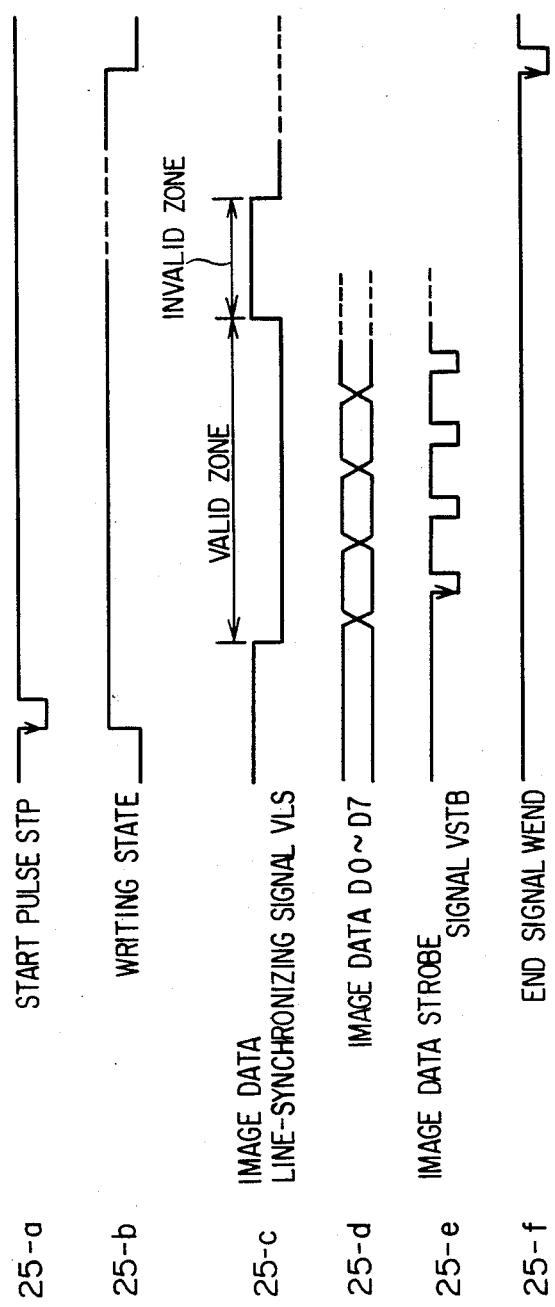

The description is made by referring to the timing chart in FIG. 25. The host computer 300 outputs a read start command via the image signal control bus 302 when reading of image information has been possible. The CPU 75 in the image processing device 200 starts reading operation for the original draft information after interpreting the command.

When the image processing circuit 2 starts enlarging or reducing operation, a start pulse STP (25-a in FIG. 25) is outputted via the image signal control bus 302 to the host computer 300 side.

The host computer 300, upon reception of the STP pulse, sets the internally provided image memory 64 at the writing state (25-b in FIG. 25), then allows the image data line-synchronizing signal VLS (25-c in FIG. 25) fall to "L", in order to have one line synchronized. In the example, the VLS signal at "L" state corresponds to the valid image zone, and the signal being in the "H" state corresponds to an invalid image zone (blanking zone).

Upon confirmation that the VLS signal is at "L", a binary coded image data D0~D7 (25-d in FIG. 25) is outputted onto the data bus 301 from the image processing device 200 side. In this case, the image data established on the data bus is written into the image memory 64, by means of the image data strobe signal VSTB (25-e in FIG. 25) transmitted from the image processing device 200. Once the image processing device 200 has read out the image information corresponding with one page of an original draft, it outputs an end signal WEND (25-f in FIG. 25) onto the image signal control bus 302, which in turn terminates the reading operation of the original draft.

Additionally, in the above-mentioned example, the present invention was applied to an image process device which reads an image based on the center of an original draft and records an image based on the center of a recording paper. However the invention may be applied to still another type of image processing device.

Firstly, if an image processing device carries out image reading and image recording operations based on one side of an original draft and recording paper, the present invention may be applied without any disadvantages, because the initial reading location of the CCD 60 is identical with the initial recording location (in the case of a laser printer, the initial illuminating location of a laser beam for recording).

Secondly, with regard to an image processing device wherein the image reading is carried out based on the center line of an original draft and the image recording is carried out based on one side of a recording paper, the writing into the output buffer circuit 90 as well as the initial reading address are as follows.

In this case, the initial writing address for a line memory either 100 or 101 is always address 0. On the contrary, the initial reading address cannot be determined solely based on a scale ratio signal and varies in accordance with the size of an original draft.

Accordingly, in such a type of image processing device, a signal designating the size of an original draft determines together with a scale ratio the initial reading address.

A case, shown in FIG. 26, where the size of an original draft 52 to be read is A4, is described below.

Figure 26:
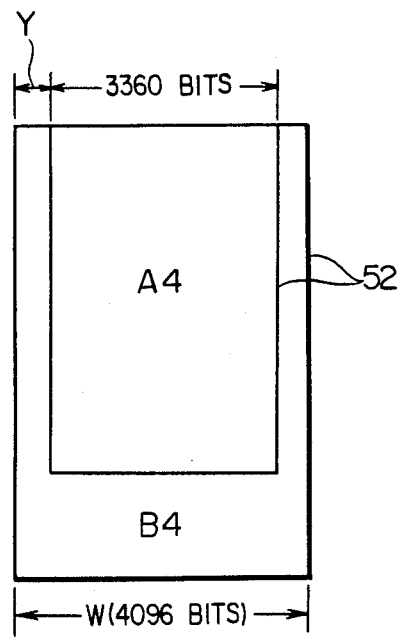
FIGS. 26 and 28 show other examples of image reading and image recording.

As mentioned previously, if the resolution is 16 dots/mm, the horizontal bit number of an A4 paper is;

$$210 \text{ mm} \times 16 \text{ dots/mm} = 3360 \text{ bit}$$

therefore, if the maximum readable draft size is B4, the value obtainable by multiplying width Y in FIG. 26 together with the scale ratio is the initial reading address to be provided for the line memory.

Accordingly, the initial reading address in a same ratio operation is;

$$(4096 - 3360)/2 = 368 \text{ bit}$$

FIG. 27 illustrates values of initial writing and initial reading addresses at an arbitrary scale ratio. In this case, the size of an original draft is A4.

Figure 28:
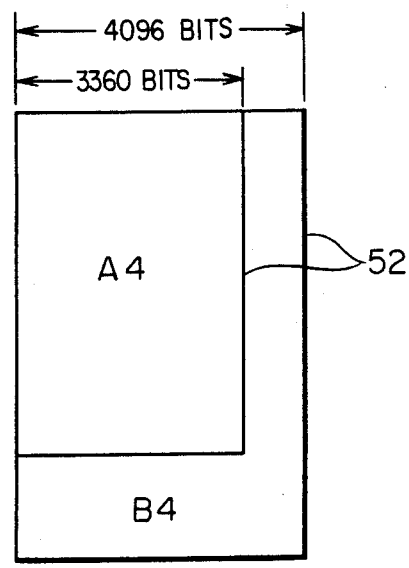

Thirdly, as shown in FIG. 28, with regard to an image processing device wherein the image reading is carried out based on one side of an original draft and the image recording is carried out based on the center line 1 of a recording paper, the initial writing and reading addresses of the buffer circuit 90 are determined in the following manner.

In this case, the initial writing address is determined based on the maximum bit number (3360 bits) of A4 size as well as the maximum bit number (4096 bits) on B4 size. Therefore;

Initial writing address =(4096−3360 ×scale ratio)/2
Accordingly, the initial reading address in this case is address 0.

If the initial writing address is a negative number (an enlarging operation), the value is used as the initial reading address. Consequently, in this case, the initial writing address is address 0.

FIG. 29 illustrates values of initial writing and initial reading addresses at an arbitrary scale ratio.

In this way, the initial writing or reading address may be modified in compliance with the reference point for reading an original draft or the similar point for writing. Further, the initial writing address for the line memory 100 or 101 may be modified in accordance with the size of a recording paper.

Additionally, in regard to the above-mentioned embodiment, the frequency of a synchronizing clock signal CLK2 generated by the timing signal generating circuit 10 is set twice that of a synchronizing clock signal for reference, under the condition that the enlarging or reducing scale ratio is so arranged to enable designation of the ratio ranging from 128/64 to 33/64 in 1/64 increments, wherein such a frequency is determined based on the maximum enlarging ratio.

If the maximum enlarging ratio is 3, for example, the frequency of synchronizing clock signal CLK2 is set three times as large as the synchronizing clock signal for reference. Accordingly, the frequency of the synchronizing clock signal CLK2 is modified in accordance with the maximum enlarging ratio employed.

Instead of ROMs, RAMs may be utilized as the memories 13 and 16. Additionally, an arithmetic circuit may be employed instead of the memory 13.

As described above, the present invention provides an arrangement, wherein an interpolation data to compensate an image data between pixels derived from image information is easily determined by storing and reading such an interpolation data. Additionally, as the apparatus in the example can eliminate the conventional requirements of modifying the frequency of transfer clock signal in accordance with an enlarging or reducing ratio, neither a complicated clock generating circuit nor control of exposure is required. More specifically, the timing function of the circuitry has been simplified, enabling the operation at any specified scale ratio, with a predetermined range because the image processing is effected, in either an enlarging or reducing operation, with a clock frequency identical with that in the same ratio operation.

Furthermore, the present invention does not involve a conventional method, wherein following interpolation of image data, the data sampling is carried out using a clock signal having a different frequency, consequently, a rapid ROM is not necessarily employed as an interpolation data memory. Additionally, according to the invention, the enlarging or reducing operation is carried out by employing data into which completely compensated image data has been incorporated, therefore, the method according to the invention can provide a better quality image as well as rapid processing when compared with a conventional method.

With this invention, the writing data stored in a line memory provided within an output buffer circuit is cleared immediately before the image data is written into the line memory. Accordingly, the invalid image data written when power was applied to the device or the similar data remaining until the modification of scale ratio is completely cleared immediately before the writing of proper image data. Because of this arrangement, only proper image data may be always read out of the line memory.

According to the invention, as the matter of course, the initial writing or reading address of the line memory is designated in correspondence with a scale ratio. Consequently, the enlarging or reducing operation is carried out as effective as the case where such an operation is based on the center of reading means, and an image may be also recorded based on the center of a recording paper.

As a result, the system according to the invention has various features. For instance, there is no possibility of the reduced image being recorded to one side of a recording paper or the image being recorded outside the printable zone of a recording paper. Additionally, as the blank zone of an original draft is not enlarged in an image enlarging operation, the proper image may be correctly recorded as required.

According to the invention, the adjusted scale ratio signal is generated based on the reading-resolution signal and the externally determined scale ratio signal, by designating the reading-resolution. The enlarging or reducing operation is, in turn, carried out based on the adjusted scale ratio signal. For this reason, the image may be recorded in the externally determined scale ratio, even if the reading-resolution differs from the recording-resolution.

As a result, the present invention provides an advantage that an image in compliance with a selected scale ratio may be easily recorded without fail.

According to the invention, the enlarging or reducing operation is carried out based on an adjusted scale ratio signal formed from the reading-resolution and the sale ratio signal being set from the host computer side, by designating a reading resolution-in compliance with a recording-resolution of a recorder selected on the host computer. This arrangement allows an image to be recorded in a scale ratio selected by the host computer, even if the reading-resolution differs from the recording-resolution.

In this case, as the scale ratio is automatically adjusted, it is not necessary any more to select a scale ratio by taking the designated recording-resolution into account. This drastically simplifies the procedure for designating a scale ratio.

Additionally, a display provided on the host computer side indicates a scale ratio as selected with a keyboard, instead of an adjusted scale ratio. This is because the indication of an adjusted scale ratio on the display may produce a misunderstanding that a wrong scale ratio has been designated.

What is claimed is:

1. An image processing apparatus for producing an image from image data of pixels and capable of enlarging or reducing the scale of the produced image by interpolating among the image data of pixels to produce an interpolated image, said apparatus comprising:
    (a) means for generating image data;
    (b) means for producing a scale signal related to a selected scale ratio;
    (c) first memory means for storing interpolation data in look-up table form which has a list of plural sets of image data, with each of said plural sets of image data having plural sampling positions corresponding, respectively, to selection signals, each of said sampling positions being provided with interpolation data, whereby said interpolation data is retrievable by addressing said first memory means with any of said plural sets of image data and a selection signal from said selection signals for respectively designating a particular sampling position, (d) second memory means for storing plural sets of processing data, each such set of processing data comprising said selection signal and a timing signal, wherein said plural sets of processing data correspond to every available scale ratio to form a group of data so that a group of processing data is identifiable by addressing said second memory means with a scale signal related to a selected scale ratio, (e) outputting means responsive to the means for producing a scale signal for retrieving from the second memory means in response to the scale signal a set of a selection signal and a timing signal corresponding to the selected scale ratio, and (f) a control means having signal input means for receiving signals from the means for generating image data, the outputting means, and the second memory means, and signal output means coupled to the first memory means, for regulating signal passage to an output device, said control means feeding said image data and said selection signal into said first memory means so as to address said interpolation data, and said control means determining the passage of said addressed interpolation data to said output device in accordance with said timing signal.

2. The image processing apparatus of claim 1, wherein said image processing apparatus comprises an image reader comprising a photoelectric converter for reading an original image and an image recorder for recording the interpolated image, and wherein said image processing apparatus further comprises a control means for compensating for a difference in pixel density between a reading resolution of said image reader and a recording resolution of said image recorder.

3. The image processing apparatus of claim 2, wherein said control means adjusts the reading resolution in accordance with the recording resolution.

4. The image processing apparatus of claim 3, wherein said control means adjusts the reading resolution in accordance with the recording resolution and the selected scale ratio.

5. The image processing apparatus of claim 4, wherein said control means adjusts the selected scale ratio in accordance with the difference between the reading resolution and the recording resolution.

6. The image processing apparatus of claim 2, further comprising a host computer coupled to said control means, and wherein said control means can be operated from said host computer.

7. The image processing apparatus of claim 6, wherein said selected scale ratio can be inputted from said host computer.

8. The image processing apparatus of claim 2, wherein said image processing apparatus comprises an output buffer circuit for storing the interpolated image data, and means for controlling a writing address and a reading address of said output buffer circuit in accordance with the scale ratio.

9. The image processing apparatus of claim 8, further comprising means for, when said output buffer circuit has an invalid area into which the interpolated image data has not been written, writing clear data into said invalid area.

10. The image processing apparatus of claim 9, wherein said image reader scans the original image in a main scanning direction with a horizontal direction-synchronizing signal, and in a sub-scanning direction with a vertical direction-synchronizing signal, and wherein the clear data is produced on the basis of the horizontal direction-synchronizing signal and the vertical direction-synchronizing signal.

11. The image processing apparatus of claim 10, wherein the clear data is "0" or "1" in binary notation.

12. The image processing apparatus of claim 8, further comprising means for setting an initial writing address and an initial reading address of said output buffer circuit in accordance with a size of record paper.

13. The image processing apparatus of claim 8, further comprising means for setting an initial writing address and an initial reading address of said output buffer circuit in accordance with a reference line for reading and writing.

14. The apparatus of claim 17, wherein said control means receives image data of pixels from image reader means producing pixels by photoelectrically scanning an original image one line by one line, and wherein said control means feeds the image data of pixels one line by one line to said first memory.

15. The apparatus of claim 14, wherein said control means feeds serially adjacent pixels to said first memory means as said plural sets of image data.

16. The apparatus of claim 1, wherein said control means comprises means for generating a first clock pulse for feeding said plural sets of image data to the first memory means and for generating a second clock pulse for outputting said selection signal and said timing signal from said second memory means.

17. The apparatus of claim 16, wherein each frequency of said first and second clock pulses is a constant.

18. The apparatus of claim 17, wherein the frequency of said second clock pulse is higher than that of said first clock pulse so as to increase the number of pixels.

19. The apparatus of claim 16, wherein each of said group of processing data has a same number of processing data.

20. The image processing apparatus of claim 1, wherein said image processing apparatus comprises
an image reader having a photoelectric converter for reading the original image;
an image recorder for recording a new image; and
a control means to compensate for a difference in pixel density between a reading resolution of said image reader and a recording resolution of said image recorder.

21. The image processing apparatus of claim 2, wherein said control means adjusts the selected scale ratio in accordance with the difference in pixel density between the reading resolution and the recording resolution so as to obtain said scale ratio signal.

22. The image processing apparatus of claim 26, wherein said image processing apparatus comprises
an output buffer circuit for storing the new image of a line of pixels; and means for controlling a writing address and a reading address of said output buffer circuit in accordance with the scale ratio signal.

23. The image processing apparatus of claim 22, further comprising means for, when said output buffer circuit has an invalid area into which a new image data has not been written, writing clear data into said invalid area.

24. The image processing apparatus of claim 23, wherein an initial writing address and an initial reading address of said output buffer circuit can be adjusted in accordance with a size of record paper.

25. The image processing apparatus of claim 20, wherein an initial writing address and an initial reading address of said output buffer circuit can be adjusted in accordance with a reference line for reading and writing.

26. The image processing apparatus of claim 1, wherein an arrangement of said selection signal and said timing signal in the group of processing data is predetermined so as to determine an interpolation pattern corresponding to the scale ratio.

27. An image processing apparatus capable of producing new image data of a line of pixels of a re-sized image, as by enlargement or reduction, in a main scanning direction from original image data of a line of pixels obtained by scanning an original image in the main scanning direction comprising:
   (a) means for generating a scale ratio signal relating to a selected scale ratio by which the original image is to be resized along said main scanning direction;
   (b) first memory means for storing interpolation data in look-up table form to be used for obtaining said new image data;
   (c) second memory means for storing data of interpolation-data-selection-signal SD to be used for selecting and reading out
      (1) the interpolation data in said first memory means corresponding to said original image data of a line of pixels, and
      (2) data of a processing-timing-signal TD, wherein said interpolation data selection signal SD comprises a specified number of valid data corresponding to each selected scale ratio, said valid data representing sampling positions of said new image data of a line of pixels relative to positions of pixels of the original image, and said processing timing signal TD has such a number of data that is equal to the number of the sampling positions of the new image data used for enlarging the original image to a predetermined maximum scale ratio and represents the timing of valid data having said number of data corresponding to the selected scale ratio;
   (d) means for reading out of said second memory means a series of data of the interpolation-data-selection signal SD and corresponding data of processing-timing-signal TD, and for outputting the selection signal SD and the timing signal TD, comprising
      (1) means for feeding said scale ratio signal to said second memory means and applying it to be an address signal to the second memory means,
      (2) means for generating a first clock signal having a frequency at least as high as that of a second clock signal multiplied by the predetermined maximum scale ratio, and
      (3) means for feeding a series of count values in synchronism with a period of said first clock signal, thereby applying it to be an address signal to the second memory means;
   (e) means for reading out the interpolation data in said first memory means corresponding to the original image data of a line of pixels, comprising
      (1) means for sequentially feeding the original image data of a line of pixels to said first memory means, using said second clock signal having the same frequency as used in scanning of the original image along said main scanning direction, thereby applying image data of said pairs of adjacent pixels to be address signals simultaneously to said first memory means, and
      (2) means for feeding to said first memory means said series of data of the interpolation-data-selection-signal SD read out of said second memory means, thereby applying said selection signal SD to be an address signal to the first memory means;
   (f) means for adjusting the timing of the interpolation-data-selection-signal SD and the address signals including a series of original image data of respective pairs of adjacent pixels so that all such respective signals may have proper values to be a correct set of address data to said first memory means at the moment such signals are inputted to it; and
   (g) means for outputting from said image processing apparatus new image data formed of the interpolation data.

28. The image processing apparatus of claim 22, wherein said output means comprises a gate circuit for adjusting the first clock signal in accordance with the processing-timing signal, and a latch circuit for regulating the passage of the interpolation data on the basis of the adjusted first clock signal.

29. The image processing apparatus of claim 28, wherein there is further provided a binary coding means for reading a threshold value from a threshold value table by using the adjusted first clock signal and for coding the new image on the basis of the threshold value.

30. An image processing apparatus capable of producing new image data of a line of pixels of a re-sized image, as by enlargement or reduction, in a main scanning direction from original image data of a line of pixels obtained by scanning an original image in the main scanning direction comprising:
   (a) means for generating a scale ratio signal relating to a selected scale ratio by which the original image is to be re-sized along said main scanning direction;
   (b) first memory means for storing interpolation data in look-up table form to be used for obtaining said new image data;
   (c) second memory means for storing data of interpolation-data-selection-signal SD to be used for selecting and reading out
      (1) the interpolation data in said first memory means corresponding to said original image data of a line of pixels, and
      (2) data of a processing-timing-signal TD, wherein said interpolation data selection signal SD comprises a specified number of valid data corresponding to each selected scale ratio, said valid data corresponding to each selected scale ratio, said valid data representing sampling positions of said new image data of a line of pixels relative to positions of pixels of the original image, and said processing-timing-signal TD has such a number of data that is equal to the number of the sampling positions of the new image data used for enlarging the original image to a predetermined maximum scale ratio and represents the timing of a valid data having said number of data corresponding to the selected scale ratio;

(d) means for reading out of said second memory means a series of sets of data of the interpolation-data-selection-signal SD and the corresponding data of processing-timing-signal TD and for outputting a set of the selection signal SD and the timing signal TD, comprising
  (1) means for feeding said scale ratio signal to said second memory means and applying it to be an address signal to the second memory means, and
  (2) means for feeding a series of count values in synchronism with a period of a second clock signal, thereby applying it to be an address signal to the second memory means;

(e) means for reading out the interpolation data in said first memory means corresponding to the original image data of a line of pixels comprising
  (1) means for sequentially feeding the original image data of a line of pixels to said first memory means, using a first clock signal having the same frequency as used in scanning of the original image along said main scanning direction, thereby applying image data of said pairs of adjacent pixels to be address signals simultaneously to said first memory means, and
  (2) means for generating said second clock signal having a frequency at least as high as that of said first clock signal multiplied by the predetermined maximum scale ratio, and
  (3) means for feeding to said first memory means said series of data of the interpolation data selection signal SD read out of said second memory means using said second clock signal, thereby applying said selection signal SD to be an address signal to the first memory, (f) means for adjusting the timing of the interpolation-data-selection-signal SD and the address signals including a series of original image data of respective pairs of adjacent pixels so that all such respective signals may have proper values to be a correct set of address data to said first memory means at the moment such signals are inputted to it; and (g) means for outputting only new image data from said image processing apparatus by regulating the passage of the interpolation data read out of said first memory means.

* * * * *